United States Patent
Maeda et al.

(10) Patent No.: US 6,380,111 B1
(45) Date of Patent: Apr. 30, 2002

(54) AMORPHOUS OPTICAL DEVICE

(75) Inventors: Yoshinobu Maeda, 2220, Kawaradacho, Yokkaichi, Mie 510-0874; Akio Konishi, Kakogawa; Hidekazu Hashima, Kobe; Hajimu Wakabayashi, Kawanishi, all of (JP)

(73) Assignees: Yoshinobu Maeda, Mie; Nihon Yamamura Glass Co., Ltd., Hyogo, both of (JP)

( * ) Notice: Subject to any disclaimer, the term of this patent is extended or adjusted under 35 U.S.C. 154(b) by 0 days.

(21) Appl. No.: 09/623,908
(22) PCT Filed: Mar. 4, 1999
(86) PCT No.: PCT/JP99/01039
§ 371 Date: Sep. 11, 2000
§ 102(e) Date: Sep. 11, 2000
(87) PCT Pub. No.: WO99/46636
PCT Pub. Date: Sep. 16, 1999

(30) Foreign Application Priority Data

Mar. 9, 1998 (JP) .......... 10-057118
Jan. 22, 1999 (JP) .......... 11-014747

(51) Int. Cl.⁷ .......... C03C 3/095; H01L 29/06
(52) U.S. Cl. .......... 501/64; 501/50; 501/78; 257/17; 257/21; 257/22; 257/82; 257/85
(58) Field of Search .......... 501/64, 50, 78, 501/41, 40; 257/21, 17, 22, 84, 85, 101, 102, 81, 82, 184; 372/44, 43; 359/248

(56) References Cited

U.S. PATENT DOCUMENTS

| | | | |
|---|---|---|---|
| 4,962,995 A | * 10/1990 | Andrews et al. | 359/341.3 |
| 4,995,046 A | * 2/1991 | Fan et al. | 372/40 |
| 5,406,420 A | * 4/1995 | Maeda | 250/227.23 |
| 5,502,737 A | * 3/1996 | Chartier et al. | 372/11 |
| 5,528,612 A | * 6/1996 | Scheps et al. | 372/21 |
| 5,557,624 A | * 9/1996 | Stultz et al. | 372/11 |
| 5,742,072 A | * 4/1998 | Maeda | 257/101 |

OTHER PUBLICATIONS

Y. Maeda et al., "Optical Signal Inverter Phenomena Using Negative Nonlinear Absorption Effect", Trans. IEE of Japan, vol. 117–C, No. 1, Jan. 1997, pp. 10–14.

* cited by examiner

Primary Examiner—Tom Dunn
Assistant Examiner—Colleen P. Cooke
(74) Attorney, Agent, or Firm—Young & Thompson

(57) ABSTRACT

A novel amorphous optical device contributes to economic construction of optical computers. Since economic parallel processing of signals such as image information is made possible, the novel amorphous optical device contributes also to development of optical computers capable of performing ultra-high speed and parallel processing, object recognizing apparatuses in which image optical signals are processed by using image optical signals, motion picture extracting apparatuses used for eyes of robots and object movement monitors and optical surge absorbers. An amorphous optical device which is doped with an element having a negative optical input-output characteristic to incident light, wherein the number of ions and/or atoms of the element is $1 \times 10^{26}$ to $2.8 \times 10^{28}$ per 1 m³ of an amorphous material, and has a negative optical input-output characteristic to incident light, an amorphous optical device which comprises amorphous optical device described above and shaped two dimensionally and controls image optical signals directly by using image optical signals and an amorphous optical device described above which uses light obtained by spectrally splitting or filtering the sunlight, thermal radiation light or light emitted from a fluorescent material by electrons emitted by electric field, or laser light as the light source are provided.

7 Claims, 16 Drawing Sheets

AMORPHOUS OPTICAL DEVICE

TECHNICAL FIELD

The present invention relates to an amorphous optical device. More particularly, the present invention relates to an amorphous optical device having a negative optical input-output characteristic to incident light and advantageously used for optical computers capable of performing ultra-high speed and parallel processing, object recognizing apparatuses in which image optical signals are processed by using image optical signals, motion picture extracting apparatuses used for eyes of robots and object movement monitors and optical surge absorbers for optical communication and optical instrumentation.

BACKGROUND ART

Although several methods have heretofore been proposed for preparing a so-called optical inverter, i.e., an optical signal inverter which is indispensable for constructing an optical computer, no devices which can work at low light intensities have been prepared.

A Josephson's device which is an electronic device utilizing superconduction can work at extreme low temperatures but hardly works at the room temperature. Devices for use at high temperatures using wide gap semiconductors such as SiC are known. However, since the properties of the semiconductors themselves vary with temperature in these devices, it is difficult that the devices are used at extremely low temperatures.

In parallel processing of signals such as image information, a planar optical device is necessary. However, planar devices such as CCD using semiconductor devices cannot perform completely parallel processing since an image must be scanned to process the signal of the image.

Optical devices which have a negative optical input-output characteristic to incident light, perform inversion of optical signals using the negative optical input-output characteristic, and construct optical inverters such as ErYAG crystals obtained by replacing Y (yttrium) in YAG (yttrium aluminum garnet) with Er (erbium), are known. However, growing such crystals requires a long time and, as the result, the obtained crystals are expensive. It is also difficult that a crystal is grown to a large size so that a device having a large area can be obtained.

Optical devices which comprise silica glass fibers doped with Er (erbium) at a core portion, have a negative optical input-output characteristic to incident light, perform inversion of light signals based on the negative optical input-output characteristic, and construct optical inverters are known. However, the number of erbium doped in these silica glass fibers is at most $1 \times 10^{25}$ per 1 m$^3$. Silica glass as long as several meters is required to exhibit the negative optical input-output characteristic and a compact device cannot be made.

The modulation degree of modulation light is defined as: $M \equiv 100 \times (I_{max} - I_{min})/(I_{max} + I_{min})$ (%). In this definition, $I_{max}$ represents the maximum value of the intensity of the modulation light and $I_{min}$ represents the minimum value of the intensity of the modulation light. In the case of ErYAG crystals obtained by replacing Y (yttrium) in YAG (yttrium aluminum garnet) with Er (erbium) and the silica glass fibers doped with Er (erbium) at a core portion, the modulation degree (M) of the transmitted light is at most 20%. Therefore, the processing of images and optical signals tends to be affected by noise and improvement has been desired.

The present invention has an object of providing a novel amorphous optical device which contributes to economic construction of optical computers and, by enabling economic parallel processing of signals such as image information, contributes to development of optical computers capable of performing ultra-high speed and parallel processing, object recognizing apparatuses in which image optical signals are processed by using image optical signals, motion picture extracting apparatuses used for eyes of robots and object movement monitors and optical surge absorbers for optical communication and optical instrumentation.

DISCLOSURE OF THE INVENTION

As the result of extensive studies by the present inventors to achieve the above object, it was found that an amorphous material doped with an element having a negative optical input-output characteristic to incident light in a high concentration exhibits an excellent negative optical input-output characteristic to incident light and a large modulation degree (M) of transmitted light in a small thickness. The present invention has been completed based on this knowledge.

The present invention provides:

(1) An amorphous optical device which is doped with an element having a negative optical input-output characteristic to incident light, wherein the number of ions and/or atoms of the element is $1 \times 10^{26}$ to $2.8 \times 10^{28}$ per 1 m$^3$ of an amorphous material, and has a negative optical input-output characteristic to incident light;

(2) An amorphous optical device described in (1), wherein the element having a negative optical input-output characteristic to incident light is a rare earth element or a transition element;

(3) An amorphous optical device described in (2), wherein the rare earth element is Er (erbium);

(4) An amorphous optical device described in any of (1) to (3), wherein the amorphous material is a glass;

(5) An amorphous optical device described in (4), wherein the glass is a borate glass, a phosphate glass, a silicate glass, a borosilicate glass, an aluminosilicate glass, a tellurite glass, a fluorophosphate glass or a fluoride glass;

(6) An amorphous optical device which comprises amorphous optical device described in any of (1) to (5) shaped two dimensionally and controls image optical signals directly by using image optical signals; and (7) An amorphous optical device described in any of (1) to (6), which uses light obtained by spectrally splitting or filtering sunlight, thermal radiation light or light emitted from a fluorescent material by electrons emitted by electric field, or laser light as a light source.

Figure 1:
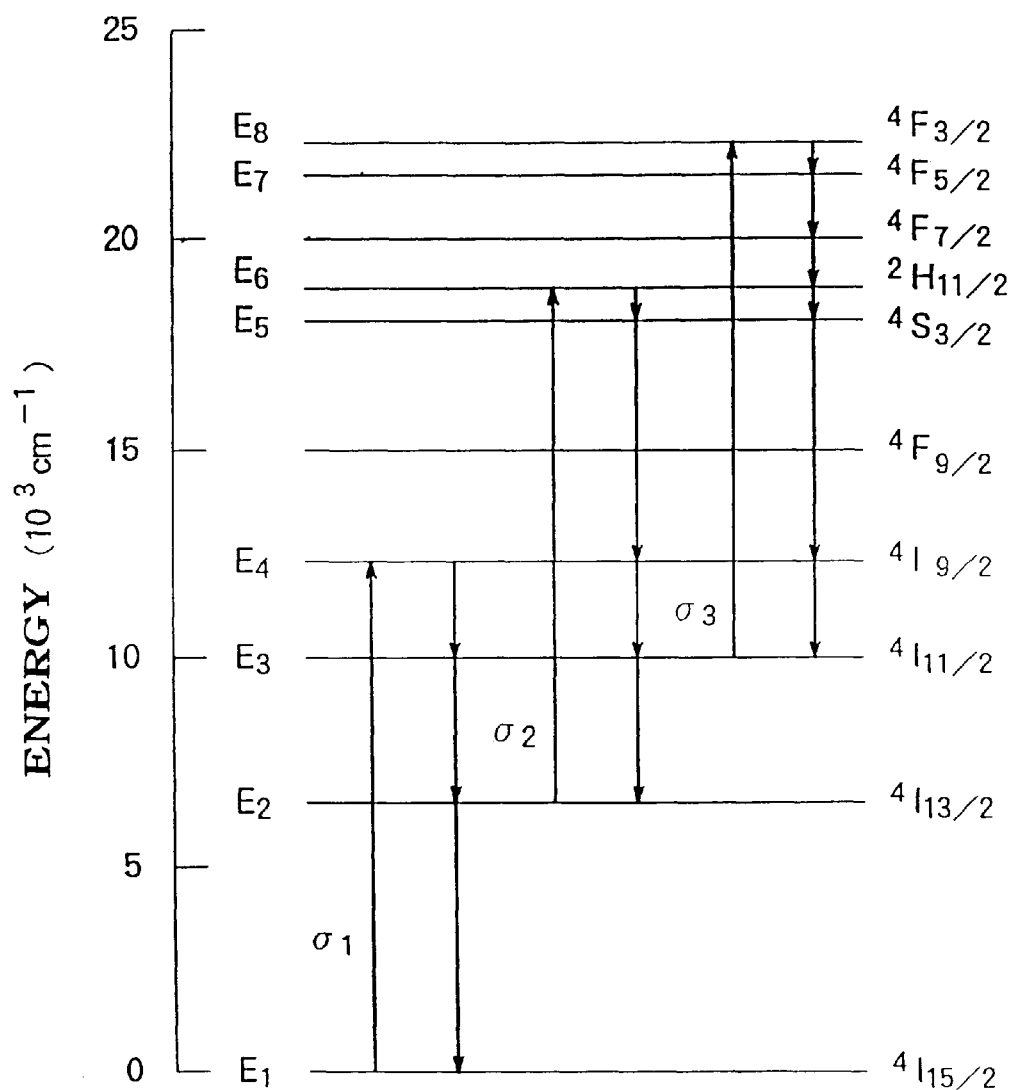
FIG. 1 shows an energy-level diagram of Er$^{3+}$ (erbium ion).

In FIGS., 1 represents a semiconductor laser device, 2 represents a modulation control circuit, 3 represents a temperature controller, 4 represents a beam splitter, 5 represents an amorphous optical device, 6 represents a first photodetector, 7 represents a second photodetector, 8 represents an optical power meter and 9 represents a digital oscilloscope.

THE MOST PREFERRED EMBODIMENT TO CARRY OUT THE INVENTION

The amorphous optical device of the present invention is doped with an element having a negative optical input-output characteristic to the incident light, wherein the number of ions and/or atoms of the element is $1 \times 10^{26}$ to $2.8 \times 10^{28}$ per 1 m$^3$ of an amorphous material, and has a negative optical input-output characteristic to the incident light. The element having the negative optical input-output characteristic to the incident light is not particularly limited. Examples of the element include transition elements such as Ti (titanium), V (vanadium), Cr (chromium), Co (cobalt), Ni (nickel) and Cu (copper); and rare earth elements such as Ce (cerium), Pr (praseodymium), Nd (neodymium), Sm (samarium), Eu (europium), Tb (terbium), Dy (dysprosium), Ho holmium), Er (erbium), Tm (thulium) and Yb (ytterbium). Among these elements, rare earth elements are preferable since an amorphous optical device having a large modulation degree (M) can be obtained. Erbium is more preferable since it is confirmed that Er (erbium) has the negative optical input-output characteristics to the incident lights of 770 nm to 850 nm and 1,500 nm to 1,600 nm and an amorphous optical device having a large modulation degree (M) can be obtained. When the number of the doping ions having the negative optical input-output characteristic to the incident light is less than $1 \times 10^{26}$ per 1 m$^3$ of the amorphous material, there is the possibility that the obtained amorphous optical device does not have a sufficiently large modulation degree and it is necessary that the working length is increased. Therefore, such the number of the doping ions is disadvantageous for producing small devices. When the number of the doping ions having the negative optical input-output characteristic to the incident light exceeds $2.8 \times 10^{28}$ per 1 m$^3$ of the amorphous material, there is the possibility that producing devices having stable amorphous structures becomes difficult. From the standpoint of the modulation degree, the production of small devices and the production of devices having stable amorphous structures, it is preferable that the number of the doping ions is $1 \times 10^{27}$ to $1.5 \times 10^{28}$ per 1 m$^3$ of the amorphous material.

The amorphous optical device of the present invention has the negative optical input-output characteristic to the incident light. The negative optical input-output characteristic to the incident light is the characteristic that the intensity of the light transmitted through the optical device decreases or increases when the intensity of the light incident on the optical device increases or decreases, respectively. In other words, the intensity of the transmitted light decreases when the intensity of the incident light increases and increases when the intensity of the incident light decreases. The negative optical input-output characteristic to the incident light is considered to be a characteristic which is exhibited based on the excited-state absorption in a multi-level system in the energy-level diagram of the element used for doping the amorphous material. The negative optical input-output characteristic of the amorphous optical device of the present invention is exhibited in the wide range of the modulation frequencies of 1 Hz to 1 GHz and also to the incident light having a small intensity in the range of about 60 nW/cm$^2$ to 100 W/cm$^2$. The negative optical input-output characteristic of the amorphous optical device of the present invention is exhibited at a temperature in the wide range of −200° C. to the softening point of the glass.

FIG. 1 shows an example of the energy-level diagram of Er$^{3+}$ (erbium ion). As shown in FIG. 1, for the incident light of a wave length in the region around 800 nm, erbium ion (Er$^{3+}$) has a ground-state absorption $E_1$–$E_4$ ($={}^4I_{15/2}$–${}^4I_{9/2}$) with an absorption cross section of $\sigma_1$, an excited-state absorption $E_2$–$E_6$ ($={}^4I_{13/2}$–${}^2H_{11/2}$) with an absorption cross section of $\sigma_2$ and an excited-state absorption $E_3$–$E_8$ ($={}^4I_{11/2}$–${}^4F_{3/2}$) with an absorption cross section of $\sigma_3$.

Figure 2:
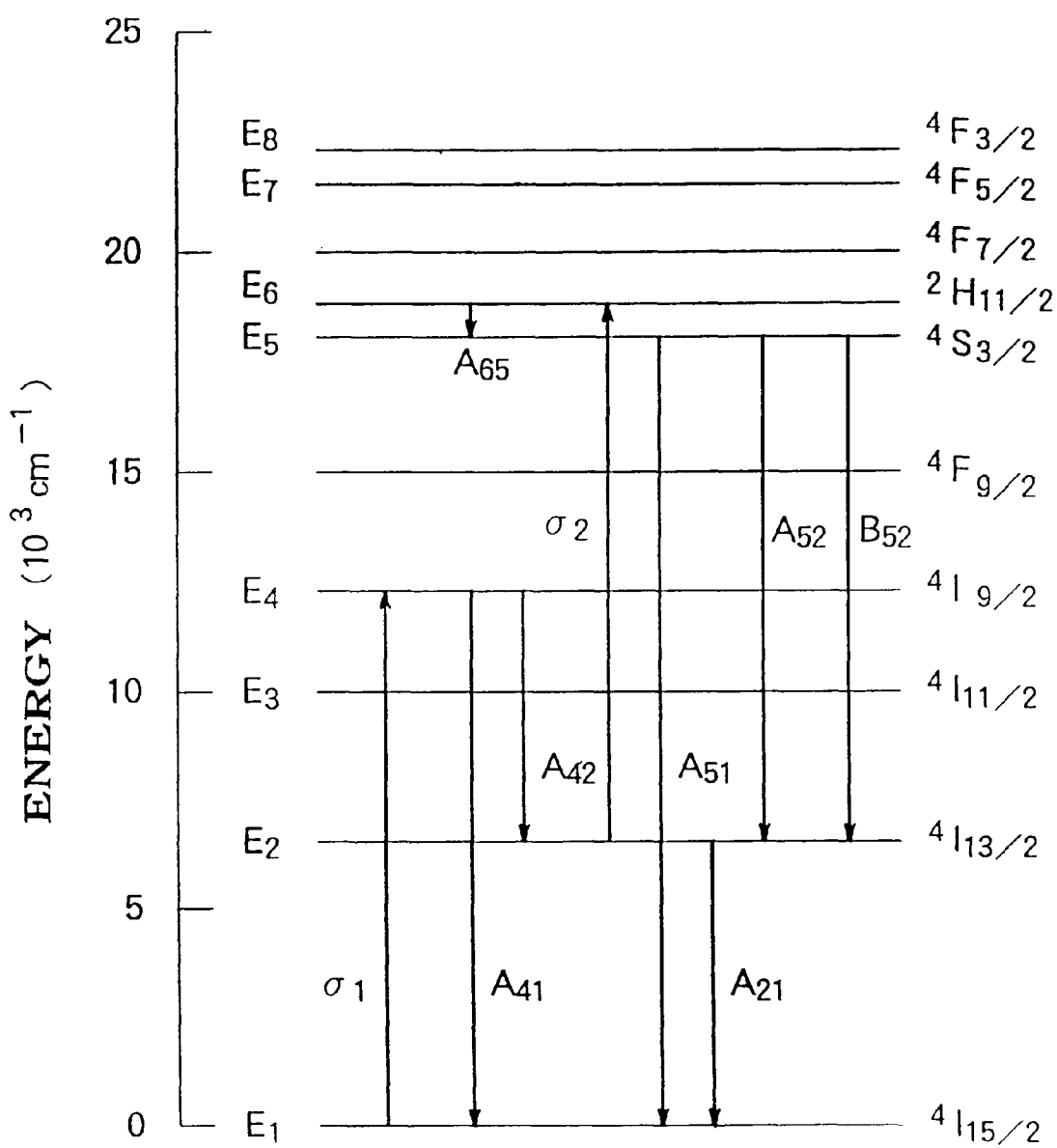
FIG. 2 shows a model diagram exhibiting the characteristics when laser photons are incident on Er$^{3+}$ (erbium ion).

FIG. 2 shows a model diagram exhibiting the characteristic when laser photons (hv) having a wave length of 790 nm are irradiated on Er$^{3+}$ (erbium ion). The electrons at the ground $E_1$ (${}^4I_{15/2}$) level are excited to the $E_4$ (${}^4I_{9/2}$) level. The electrons excited to the $E_4$ (${}^4I_{9/2}$) level are relaxed to the $E_2$ (${}^4I_{13/2}$) level and the ground $E_1$ (${}^4I_{15/2}$) level at relaxation rates of $A_{42}$ and $A_{41}$, respectively. Since the $E_2$ (${}^4I_{13/2}$) level is a metastable level, the electrons stored at the $E_2$ (${}^4I_{13/2}$) level are excited again to the $E_6$ (${}^2H_{11/12}$) level by absorption of the incident laser photons (hv). Most of the electrons excited to the $E_6$ (${}^2H_{11/2}$) level are relaxed nonradiatively to the $E_5$ (${}^4S_{3/2}$) level located immediately below the $E_6$ (${}^2H_{11/2}$) level at a relaxation rate of $A_{65}$. This process proceeds via phonons. The electrons relaxed to the $E_5$ (${}^4S_{3/2}$) level are transited mainly optically to the $E_2$ (${}^4I_{13/2}$) level and the ground $E_1$ (${}^4I_{15/2}$) level at rates of $A_{52}$ and $A_{51}$, respectively. Stimulated emission takes place at a rate of $B_{52}$ and the rate of the electrons transited from the $E_5$ (${}^4S_{3/2}$) level to the $E_2$ (${}^4I_{13/2}$) level increases. The electrons transited to the $E_2$ (${}^4I_{13/2}$) level repeat again the above processes of excitation, relaxation and transition by absorbing the incident laser photons (hv). In other words, when the intensity of the incident laser light increases, electrons are excited and transited to the $E_2$ ($^4I_{13/2}$) level and the above multi-stage absorption processes are induced. Thus, the enhanced absorption takes place and the intensity of the transmitted light decreases. When the intensity of the incident laser light decreases, the enhanced absorption which has been taking place is suppressed and the intensity of the transmitted light increases as the counteraction. It is considered that the negative nonlinear absorption effect, i.e., the negative optical input-output characteristic, is exhibited as the result.

Figure 3:
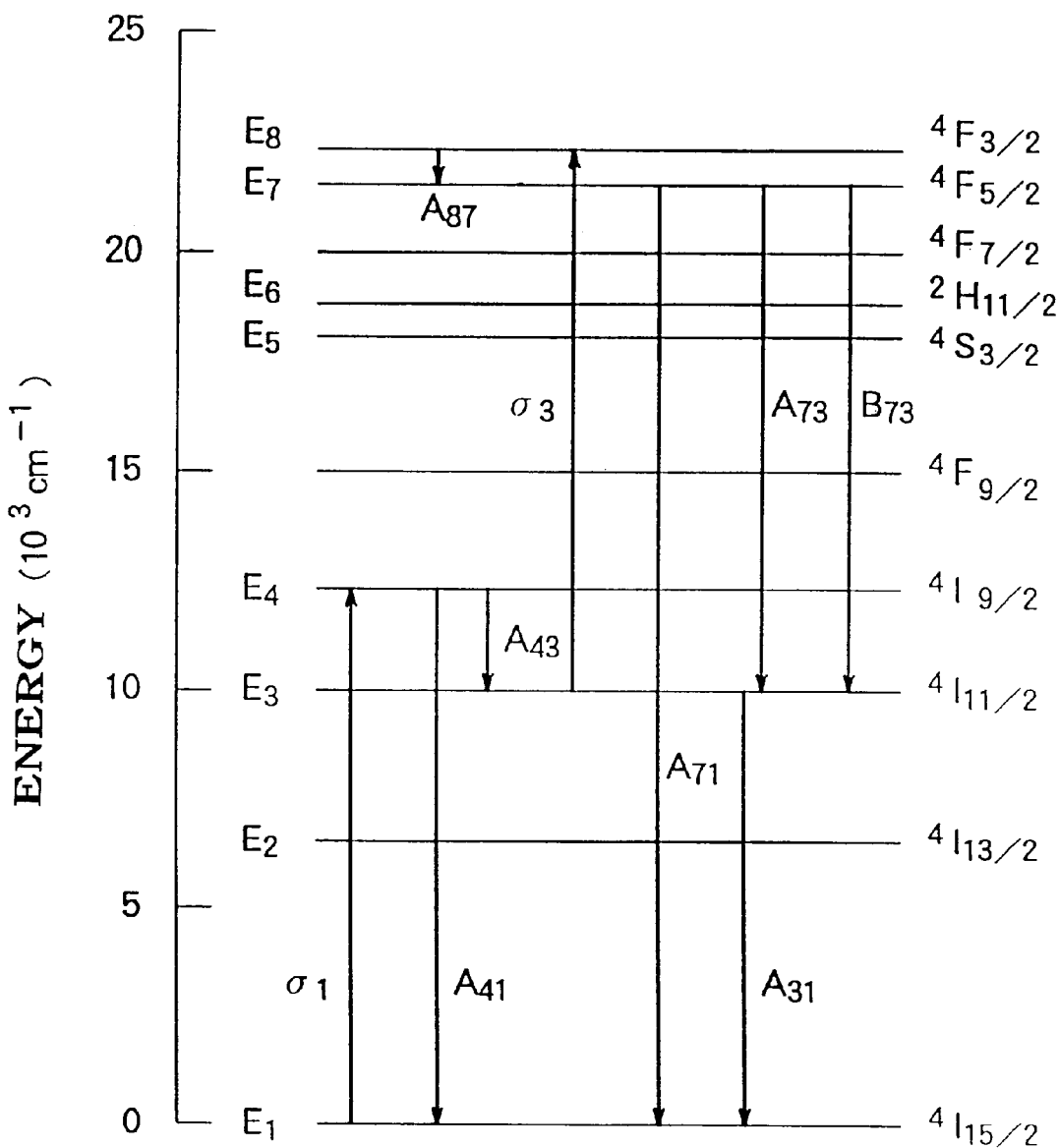
FIG. 3 shows a model diagram exhibiting the characteristics when laser photons are incident on Er$^{3+}$ (erbium ion).

FIG. 3 shows a model diagram exhibiting the characteristic when laser photons (hv) having a wave length of 810 nm are irradiated on $Er^{3+}$ (erbium ion). The electrons at the ground $E_1$ ($^4I_{15/2}$) level are excited to the $E_4$ ($^4I_{9/2}$) level. The electrons excited to the $E_4$ ($^4I_{9/2}$) level are relaxed to the $E_3$ ($^4I_{11/2}$) level and the ground $E_1$ ($^4I_{15/2}$) level at relaxation rates of $A_{43}$ and $A_{41}$, respectively. Since the $E_3$ ($^4I_{11/2}$) level is a metastable level, the electrons stored at the $E_3$ ($^4I_{11/2}$) level are excited again to the $E_8$ ($^4F_{3/2}$) level by absorption of the incident laser photons (hv). Most of the electrons excited to the $E_8$ ($^4F_{3/2}$) level are relaxed nonradiatively to the $E_7$ ($^4F_{5/2}$) level located immediately below the $E_8$ ($^4F_{3/2}$) level at a relaxation rate of $A_{87}$. This process proceeds via phonons. The electrons relaxed to the $E_7$ ($^4F_{5/2}$) level are transited mainly optically to the $E_3$ ($^4I_{11/2}$) level and the ground $E_1$ ($^4I_{15/2}$) level at rates of $A_{73}$ and $A_{71}$, respectively. Stimulated emission takes place at a rate of $B_{73}$ and the rate of the electrons transited from the $E_7$ ($^4F_{5/2}$) level to the $E_3$ ($^4I_{11/2}$) level increases. The electrons transited to the $E_3$ ($^4I_{11/2}$) level repeat again the above processes of excitation, relaxation and transition by absorbing the incident laser photons (hv). In other words, when the intensity of the incident laser light increases, electrons are excited and transited to the $E_3$ ($^4I_{11/2}$) level and the above multi-stage absorption processes are induced. Thus, the enhanced absorption takes place and the intensity of the transmitted light decreases. When the intensity of the incident laser light decreases, the enhanced absorption which has been taking place is suppressed and the intensity of the transmitted light increases as the counteraction. It is considered that the negative nonlinear absorption effect, i.e., the negative optical input-output characteristic, is exhibited as the result.

It is also considered that, when laser photons having a wave length of 1,500 nm to 1,600 nm are incident on $Er^{3+}$ (erbium ion), the negative optical input-output characteristic is exhibited due to the enhanced absorption arising from the repeated processes of excitation, relaxation and transition.

In the amorphous optical device of the present invention, the amorphous material which is doped with the element having the negative optical input-output characteristic to the incident light is not particularly limited. Examples of the amorphous material include borate glasses, phosphate glasses, silicate glasses, borosilicate glasses, aluminosilicate glasses, tellurite glasses, fluorophosphate glasses and fluoride glasses. Examples of the borate glass include glasses having the components of $Li_2O$—$B_2O_3$, $Na_2O$—$B_2O_3$, $K_2O$—$B_2O_3$, $MgO$—$B_2O_3$, $CaO$—$B_2O_3$, $PbO$—$B_2O_3$, $Na_2O$—$CaO$—$B_2O_3$, $ZnO$—$PbO$—$B_2O_3$ and $Al_2O_3$—$B_2O_3$. Examples of the phosphate glass include glasses having the components of $Li_2O$—$P_2O_5$, $Na_2O$—$P_2O_5$, $MgO$—$P_2O_5$, $CaO$—$P_2O_5$, $BaO$—$P_2O_5$, $K_2O$—$BaO$—$P_2O_5$, $Al_2O_3$—$P_2O_5$, $SiO_2$—$P_2O_5$, $B_2O_3$—$P_2O_5$, $WO_3$—$P_2O_5$ and $Al_2O_3$—$B_2O_3$—$P_2O_5$. Examples of the silicate glass include glasses having the components of $SiO_2$—$Li_2O$, $SiO_2$—$Na_2O$, $SiO_2$—$K_2$, $SiO_2PbO$, $SiO_2$—$Bi_2O_3$ and $SiO_2$—$BaO$. Examples of the borosilicate glass include glasses having the components of $SiO_2$—$B_2O_3$, $SiO_2$—$B_2O_3$—$CaO$—$Li_2O$, $SiO_2$—$B_2O_3$—$PbO$—$ZnO$, $SiO_2$—$B_2O_3$—$BaO$—$Na_2O$ and $SiO_2$—$B_2O_3$—$ZrO_2$. Examples of the aluminosilicate glass include glasses having the components of $SiO_2$—$Al_2O_3$, $SiO_2$—$Al_2O_3$—$Na_2O$, $SiO_2$—$Al_2O_3$—$BaO$, $SiO_2$—$Al_2O_3$—$TiO_2$, $SiO_2$—$Al_2O_3$—$ZnO$ and $SiO_2$—$Al_2O_3$—$ZrO_2$. Examples of the tellurite glass include glasses having the components of $TeO_2$—$WO_3$ and $TeO_2$—$WO_3$—$PbO$. Examples of the fluorophosphate glass include glasses having the components of $Al(PO_3)_3$—$AlF_3$—$NaF$—$CaF_2$ and $AlPO_4$—$AlF_3$—$CaF_2$—$BaF_2$. Examples of the fluoride glass include glasses having the components of $BeF_2$, $NaF$—$BeF_2$, $ZrF_4$—$BaF_2$—$LaF_3$—$AlF_3$, $GdF_3$—$BaF_2$—$ZrF_4$ and $AlF_3$—$BaF_2$—$MgF_2$—$CaF_2$—$NaF$. Germanate glasses and chalcogenide glasses can also be used. Since these glasses can be doped with the element having the negative input-output characteristic to the incident light in a high concentration, amorphous optical devices having small sizes can be produced. In particular, since glasses are suitable for mass production and easily formed to desired shapes, amorphous optical devices having various shapes such as sheets having a large area and a small thickness, beads, lenses and short fibers can be economically produced It is also possible that the refractive index is controlled by ion exchange of glasses of the above shapes containing alkali metals and optical waveguides and graded index lenses are produced. The amorphous material such as glasses can be produced in accordance with the conventional melting-quenching process. The amorphous material can also be produced in accordance with a vapor deposition process such as the PVD process and the CVD process or a liquid phase process such as the sol-gel process. In accordance with the vapor deposition process and the liquid phase process, amorphous materials (or glasses) having the same components as those of the glasses described above can be produced in the range of composition wider than that produced in accordance with the melting-quenching process. Moreover, thin films can be produced and amorphous optical devices of the waveguide type can be produced by utilizing the nano-processing technology which is used in the production of semiconductor devices.

Since the modulation degree (M) in the amorphous optical device of the present invention can be made larger than that in conventional devices, the effect of noise in the image processing and the optical signal processing can be suppressed. The amorphous optical device of the present invention can be two dimensionally shaped and controls image optical signals directly by using image optical signals. Because two dimensionally shaped amorphous optical device of the present invention can control image optical signals directly by using image optical signals, the amorphous optical device can be used as an object recognizing apparatus having a very high processing speed. In the amorphous optical device of the present invention, the modulation degree of the transmitted light changes from positive values to negative values and further from negative values to positive values as the modulation degree of the incident light increases and a steep threshold appears at the boundary from the positive values to the negative values. Image signals can be processed by utilizing this phenomenon. More specifically, since the first image optical signal can be controlled by the second control optical signal in a manner such that the intensity of the transmitted image signal can be either inverted or reverted, highly parallel processing of images becomes possible. When the incident light has an excessively strong intensity, the amorphous optical device can absorbs the excessively strong intensity light due to the negative optical input-output characteristic. Therefore, the amorphous optical device can also be used as the amorphous optical device for protection of detectors and the like (the optical surge absorber).

As the light source of the amorphous optical device of the present invention, light obtained by spectrally splitting or filtering the sunlight, thermal radiation light or light emitted from a fluorescent material by electrons emitted by electric field, or laser light such as semiconductor laser, titanium-sapphire laser and dye laser can be used. For example, the negative input-output characteristic to the incident light can be exhibited by using light obtained by spectrally splitting light emitted by a xenon lamp. Semiconductor laser works in a restricted temperature range. The amorphous optical device of the present invention can be used at high temperatures when the amorphous optical device is used in a system using the sunlight or light from various light emitting bodies as the light source. Since the amorphous optical device of the present invention works even under a minute input, it is possible that the amorphous optical device is used under weak incident light such as light obtained by spectral splitting. The laser light incident on the amorphous optical device may also be light which has been signalized by internal modulation or external modulation or signalized by modulation using a rotating filter or a rotating reflector. The transmittance or the reflectance varies in the direction of the circumference. By constructing a system having a vertical-cavity surface-emitting laser array using the amorphous optical device of the present invention, optical computers capable of performing ultra-high speed and parallel processing, object recognizing apparatuses in which image optical signals are processed by using image optical signals, motion picture extracting apparatuses used for eyes of robots and object movement monitors and optical surge absorbers used for optical communication and optical instrumentation can be economically constructed.

EXAMPLES

The present invention will be described more specifically with reference to examples in the following. However, the present invention is not limited to the examples.

Figure 4:
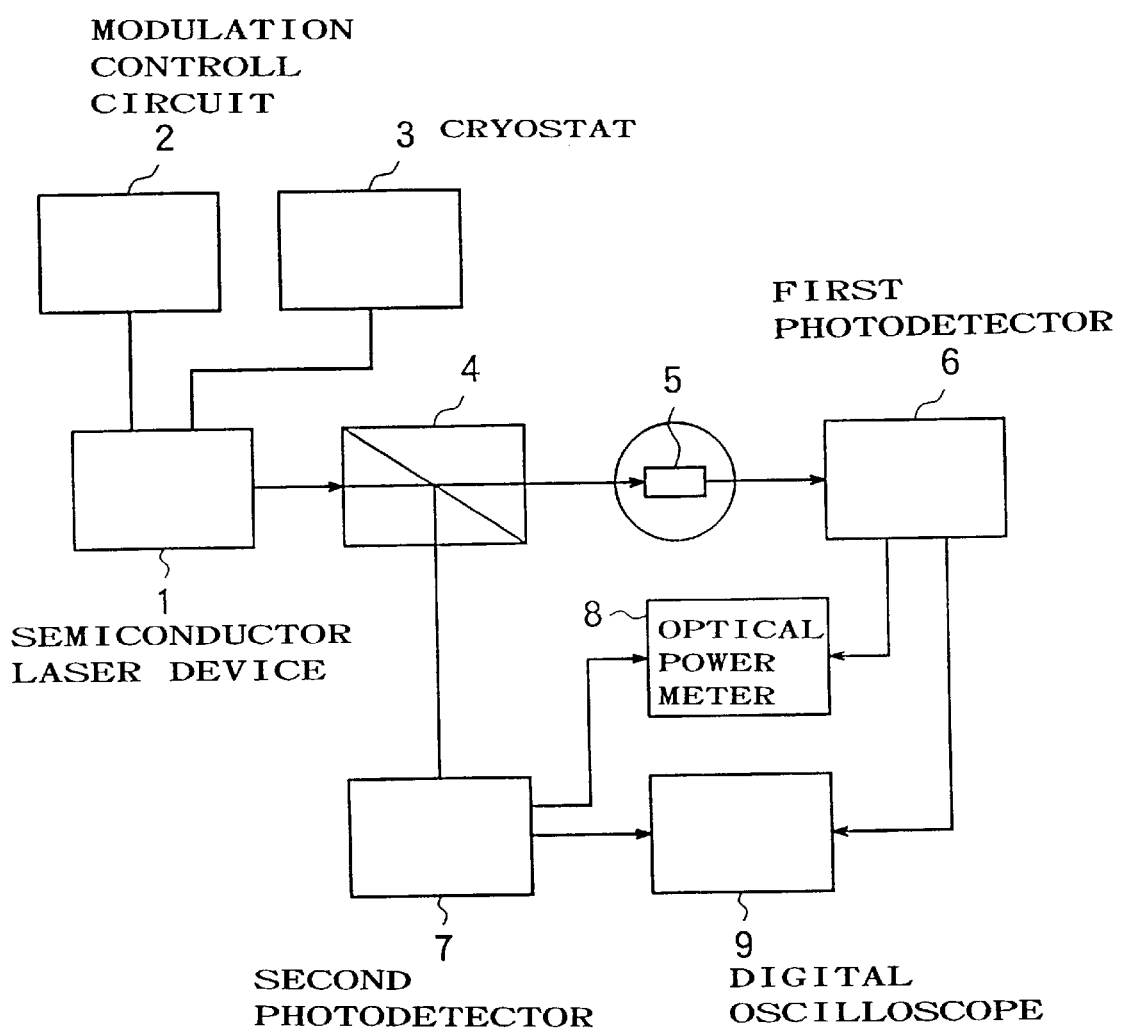
FIG. 4 shows a block diagram exhibiting the construction of an apparatus for the measurement of the optical input-output characteristic used in Examples.

In the examples, the optical input-output characteristics (the frequency characteristic and the modulation characteristic) of an amorphous optical device were measured by using the apparatus for the measurement shown in FIG. 4. As the source of the incident light on the amorphous optical device in the apparatus, (A) a GaAlAs semiconductor laser device which could generate the standard output of 30 mW under the injection current of 100 mA (hereinafter, referred to as semiconductor laser A) 1, (B) a GaAlAs high output tunable semiconductor laser device which could generate the standard output of 10 mW under the injection current of 75 mA (hereinafter, referred to as semiconductor laser B) 1 or (C) a tunable semiconductor laser device which could generate the standard output of 2 mW under the injection current of 80 mA (hereinafter, referred to as semiconductor laser C) 1 was used.

In semiconductor laser A, the temperature of a laser head was controlled by a temperature controller 3 so that laser light having a constant wave length of 790 nm or 805 nm was emitted. The emitted light is directly modulated and an amplitude modulated optical wave having a wave form such as a square wave form or a sinusoidal wave form could be obtained by a modulation control circuit 2. In semiconductor laser B, the temperature of a laser head was controlled by a temperature controller 3 and the semiconductor laser B was driven with control so that laser light having a constant wave length in the range of 790 nm to 815 nm was emitted. The emitted light is directly modulated and an amplitude modulated optical wave having a wave form such as a square wave form or a sinusoidal wave form could be obtained by a modulation control circuit 2. In semiconductor laser C, the temperature of a laser head was controlled by a temperature controller 3 and the semiconductor laser C was driven with control so that laser light having a constant wave length in the range of 1,500 nm to 1,600 nm was emitted. The emitted light was directly modulated and an amplitude modulated optical wave having a wave form such as a square wave form or a sinusoidal wave form could be obtained by a modulation control circuit 2.

The modulated laser light was spectrally split into two beams by a beam splitter 4 disposed at the output side of the semiconductor laser device. One of the splitted laser beams was irradiated on an amorphous optical device 5 and the other of the splitted laser beams was irradiated on a second photodetector 7.

The laser beam incident on the amorphous optical device 5 was transmitted through the amorphous optical device and detected as the transmitted light by a first photodetector 6. The other laser beam incident on the second photodetector 7 was detected as the incident light on the amorphous optical device.

The transmitted light and the incident light which had been detected by the first photodetector 6 and the second photodetector 7, respectively, were observed by an optical power meter 8 and a digital oscilloscope 9.

Example 1

As raw materials of a glass, $Er_2O_3$, $H_3BO_3$, $ZrO_2$, $SiO_2$, $SrCO_3$, $ZnO$ and $Nb_2O_5$ were weighed and mixed together in amounts such that the glass had a composition of 62.9% by weight of $Er_2O_3$, 26.8% by weight of $B_2O_3$, 5.6% by weight of $ZrO_2$, 2.2% by weight of $SiO_2$, 0.9% by weight of $SrO$, 0.8% by weight of $ZnO$ and 0.8% by weight of $Nb_2O_5$ and a weight of 100 g. The obtained mixture was placed into an alumina crucible. After the crucible was closed by a cap, the mixture was melted and stirred at 1,400° C. for 1 hour. The melt was poured on an iron plate which was heated in advance and annealed and a borate glass doped with Er (erbium) element in a high concentration was obtained.

The obtained borate glass had a glass transition temperature of 708° C. as measured by a differential thermal analyzer, a density of 4.6 g/cm$^3$ as measured in accordance with the Archimedes' method and the calculated number of $Er^{3+}$ ions of $9.0 \times 10^{27}$ per 1 m$^3$.

Figure 5:
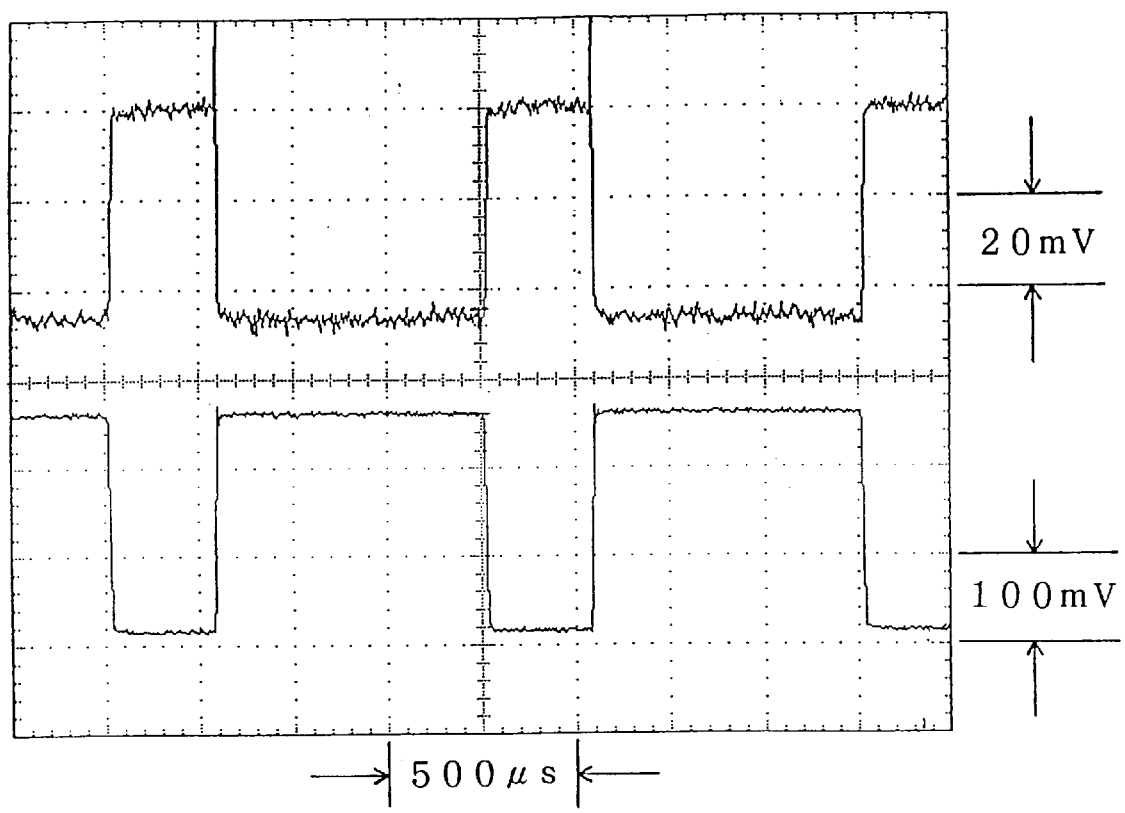
FIG. 5 shows a diagram exhibiting the optical input-output characteristic (the modulation degree characteristic).
Figure 6A:
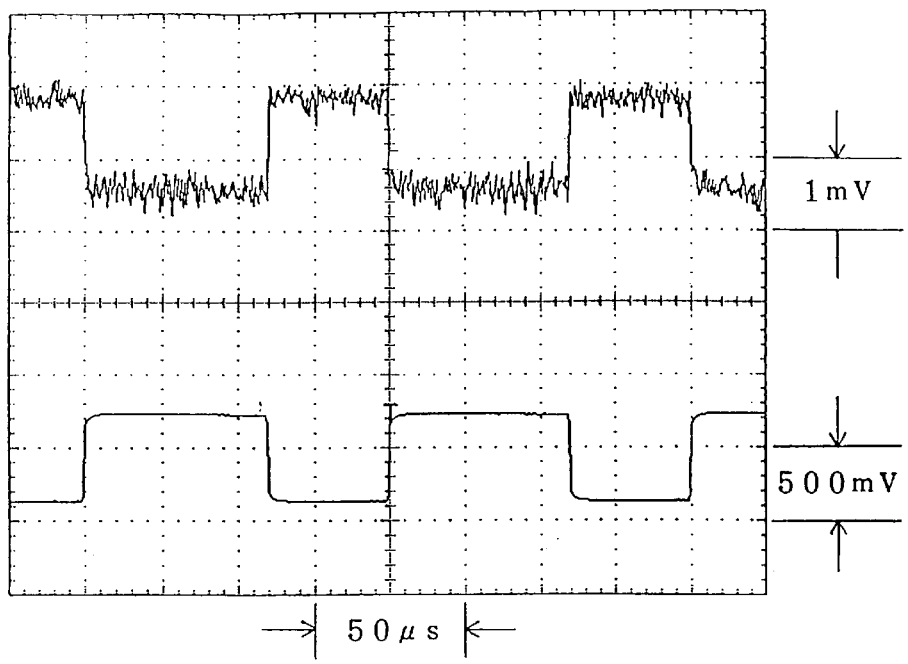
FIGS. 6(a) and 6(b) show diagrams exhibiting the optical input-output characteristics (the frequency characteristics).
Figure 6B:
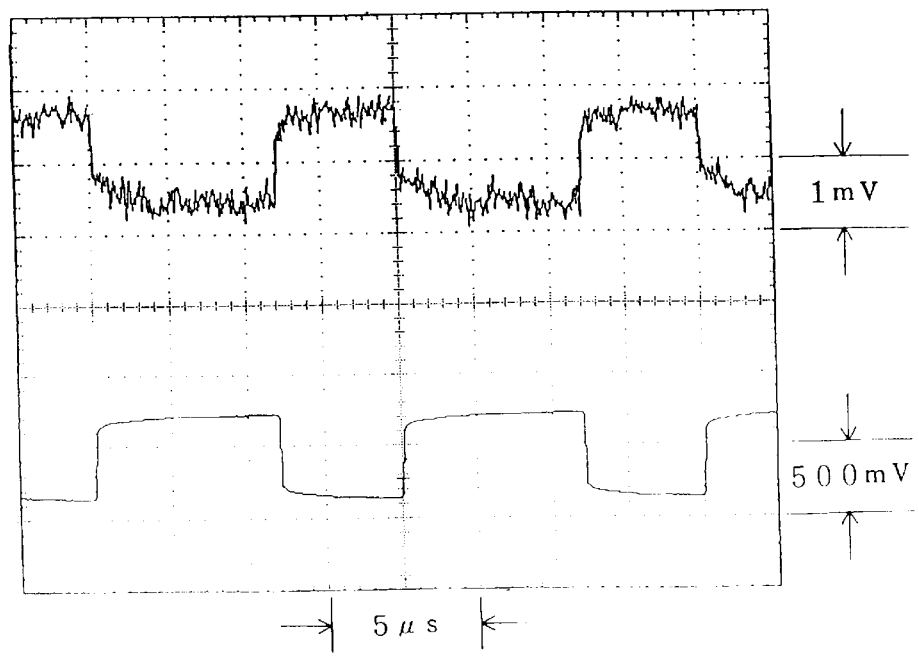
Figure 7A:
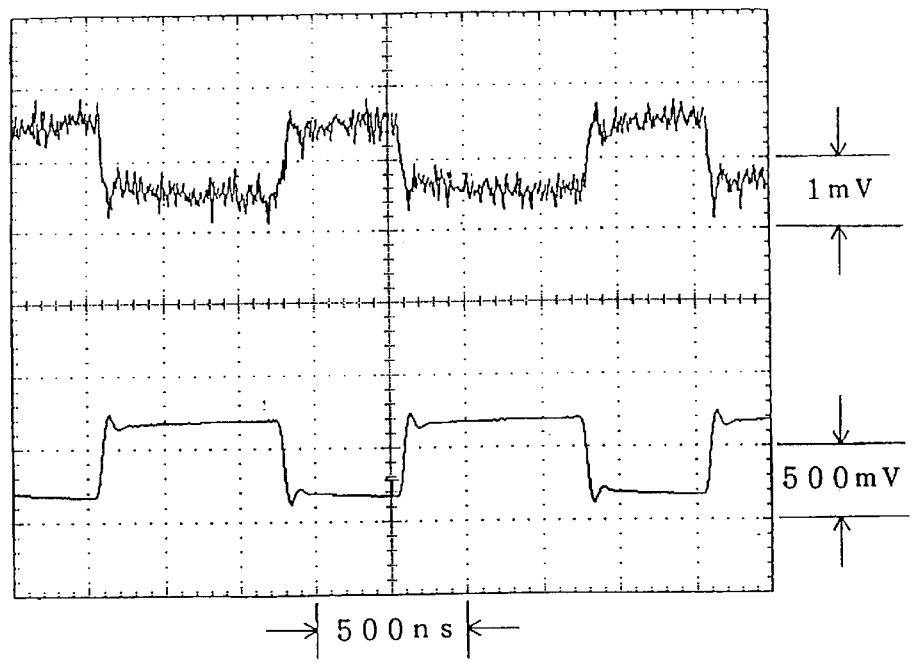
FIGS. 7(a) and 7(b) show diagrams exhibiting the optical input-output characteristics (the frequency characteristics).
Figure 7B:
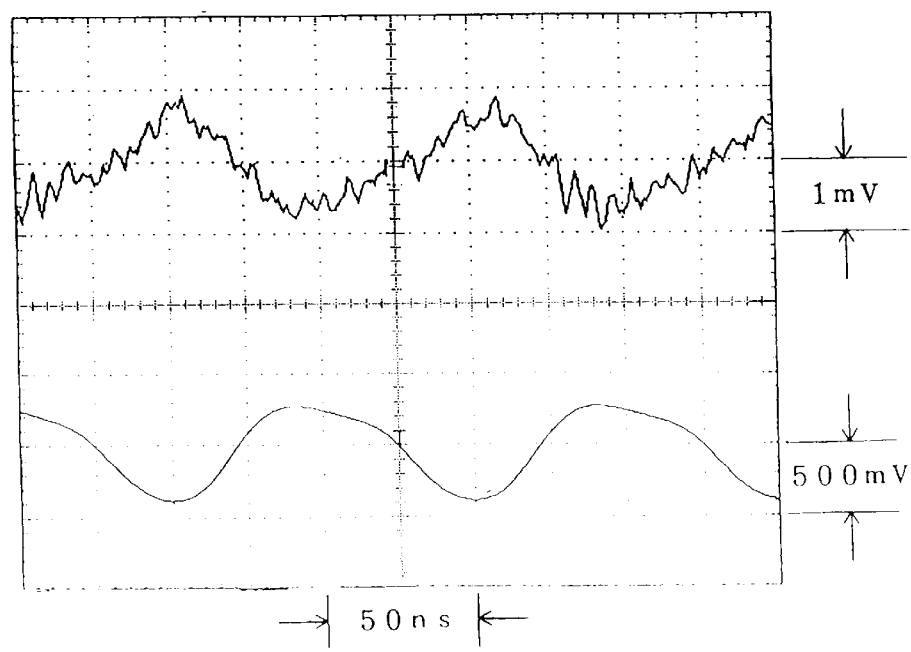

The obtained borate glass was cut and polished and a glass optical device having a thickness of 25 mm was obtained. Using semiconductor laser B as the light source of the incident light on this glass optical device, the optical input-output characteristic (the modulation degree) of the glass optical device was measured at a wave length of 810 nm, a modulation frequency of 1 kHz and a modulation degree of the incident light of 56%. The obtained results are shown in FIG. 5. In FIG. 5, the upper diagram shows the wave form of the transmitted light and the lower diagram shows the wave form of the incident light. As clearly shown in FIG. 5, the laser light incident on the glass optical device came out with inverted light intensities after being transmitted through the glass optical device. The modulation degree (M) of the transmitted light as calculated from this Figure was 64%.

Using semiconductor laser A as the light source, the light having a wave length of 790 nm, a modulation degree of 60% to 74% and modulation frequencies of 10 kH, 100 kHz, 1 MHz and 10 MHz was irradiated on the glass optical device having a thickness of 25 mm, and the optical input-output characteristic (the frequency characteristic) of the glass optical device was measured. FIGS. 6(a), 6(b), 7(a) and 7(b) show the results of the measurements at modulation frequencies of 10 kHz, 100 kHz, 1 MHz and 10 MHz, respectively. In each Figure, the upper diagram shows the wave form of the transmitted light and the lower diagram shows the wave form of the incident light. As clearly shown in above Figures, the laser light incident on the glass optical device came out with inverted light intensities after being transmitted through the glass optical device.

Figure 8:
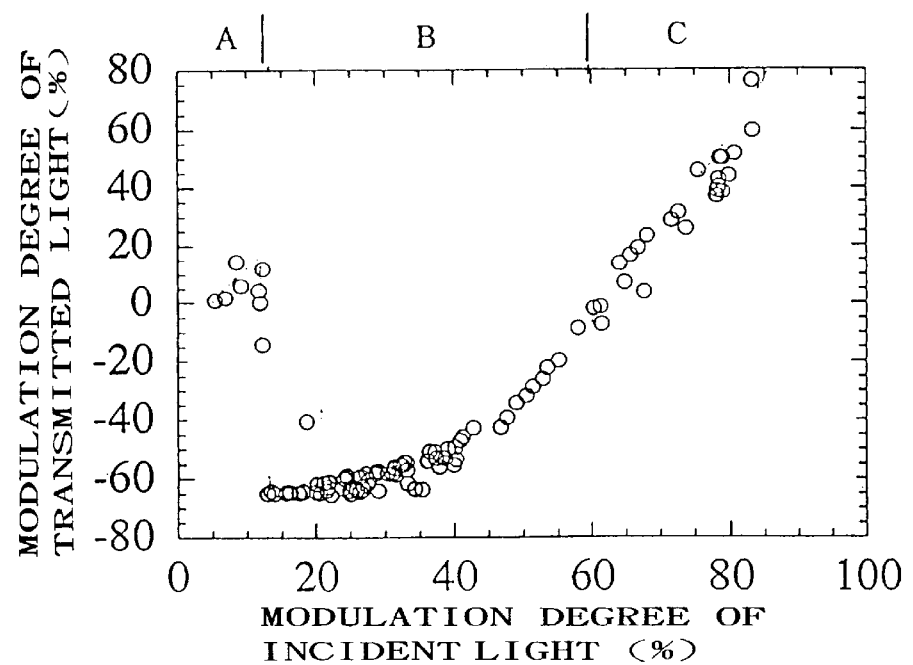
FIG. 8 shows a diagram exhibiting the relation between the modulation degree of the incident light and the modulation degree of the transmitted light.

The relation between the modulation degree of the incident light on the glass optical device and the modulation degree of the light transmitted through the glass optical device was examined. Using semiconductor laser B as the light source of the incident light on the glass optical device, the incident light having a wave length of 811 nm was modulated so that the modulation frequency was fixed to 1 kHz and modulation degrees were varied, and the modulation degree of the light transmitted through the glass optical device was measured. The results of the measurements are shown in FIG. 8. As shown in FIG. 8, the modulation degree of the transmitted light varies depending on the modulation degree of the incident light in a manner such that the modulation degree is positive in the range A, negative in the range B and positive in the range C. It is also shown that a steep threshold is present at the boundary of the range A and the range B.

Example 2

As raw materials of a glass, $Er_2O_3$, $H_3PO_4$, $Al(OH)_3$ and $H_3BO_3$ were weighed, mixed together and calcined in amounts such that the glass had a composition of 47.6% by weight of $Er_2O_3$, 49.6% by weight of $P_2O_5$, 1.0% by weight of $Al_2O_3$ and 1.8% by weight of $B_2O_3$ and a weight of 100 g. The obtained mixture was placed into an alumina crucible. After the crucible was closed by a cap, the mixture was melted and stirred at 1,450° C. for 1 hour. The melt was poured on an iron plate which was heated in advance and annealed and a phosphate glass doped with Er (erbium) element in a high concentration was obtained.

The obtained phosphate glass had a glass transition temperature of 697° C. as measured by a differential thermal analyzer, a density of 3.6 g/cm$^3$ as measured in accordance with the Archimedes' method and the calculated number of $Er^{3+}$ ions of $5.5\times10^{27}$ per 1 m$^3$.

Figure 9:
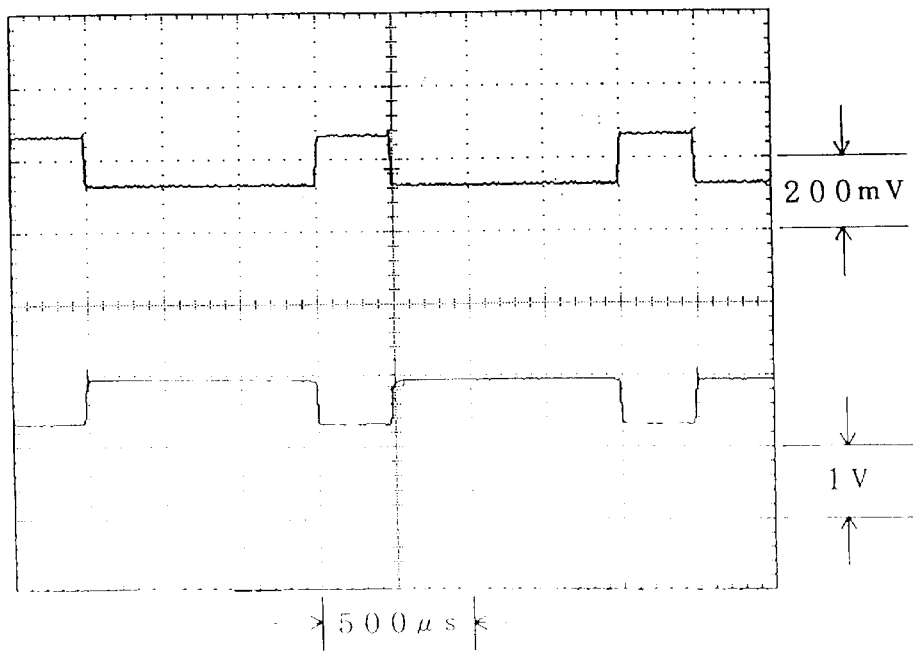
FIG. 9 shows a diagram exhibiting the optical input-output characteristic.

The obtained phosphate glass was cut and polished and a glass optical device having a thickness of 20 mm was obtained. Using semiconductor laser B as the light source of the incident light on this glass optical device, the optical input-output characteristic of the glass optical device was measured at a wave length of 811 nm, a modulation frequency of 1 kHz and a modulation degree of the incident light of 13%. The obtained results are shown in FIG. 9. In FIG. 9, the upper diagram shows the wave form of the transmitted light and the lower diagram shows the wave form of the incident light. As clearly shown in FIG. 9, the laser light incident on the glass optical device came out with inverted light intensities after being transmitted through the glass optical device.

Figures 10A, 10B, 10C, 10D, 10E:
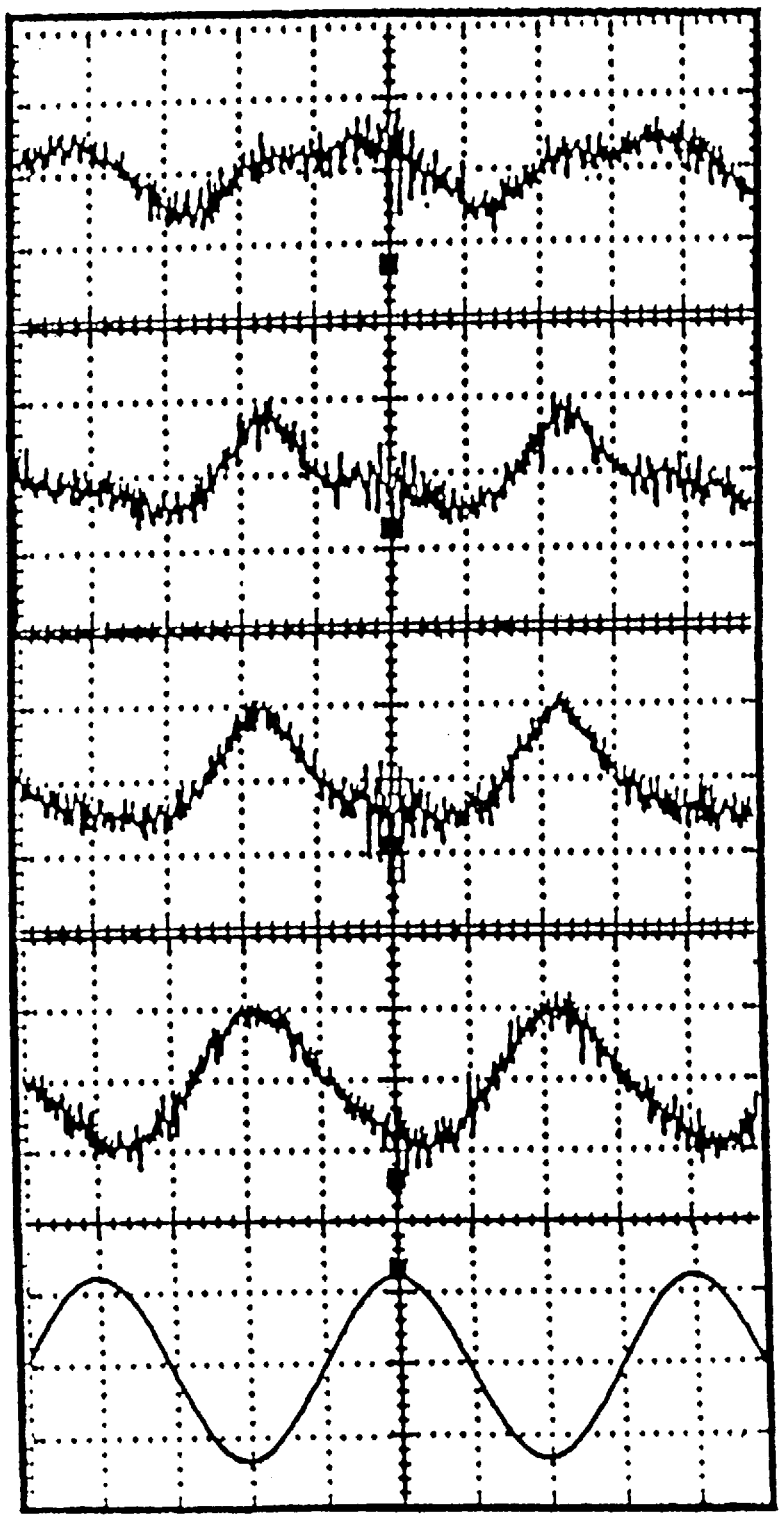
FIGS. 10(a), 10(b), 10(c), 10(d) and 10(e) show diagrams exhibiting the optical input-output characteristics (the temperature characteristics).
Figures 11A, 11B, 11C, 11D, 11E:
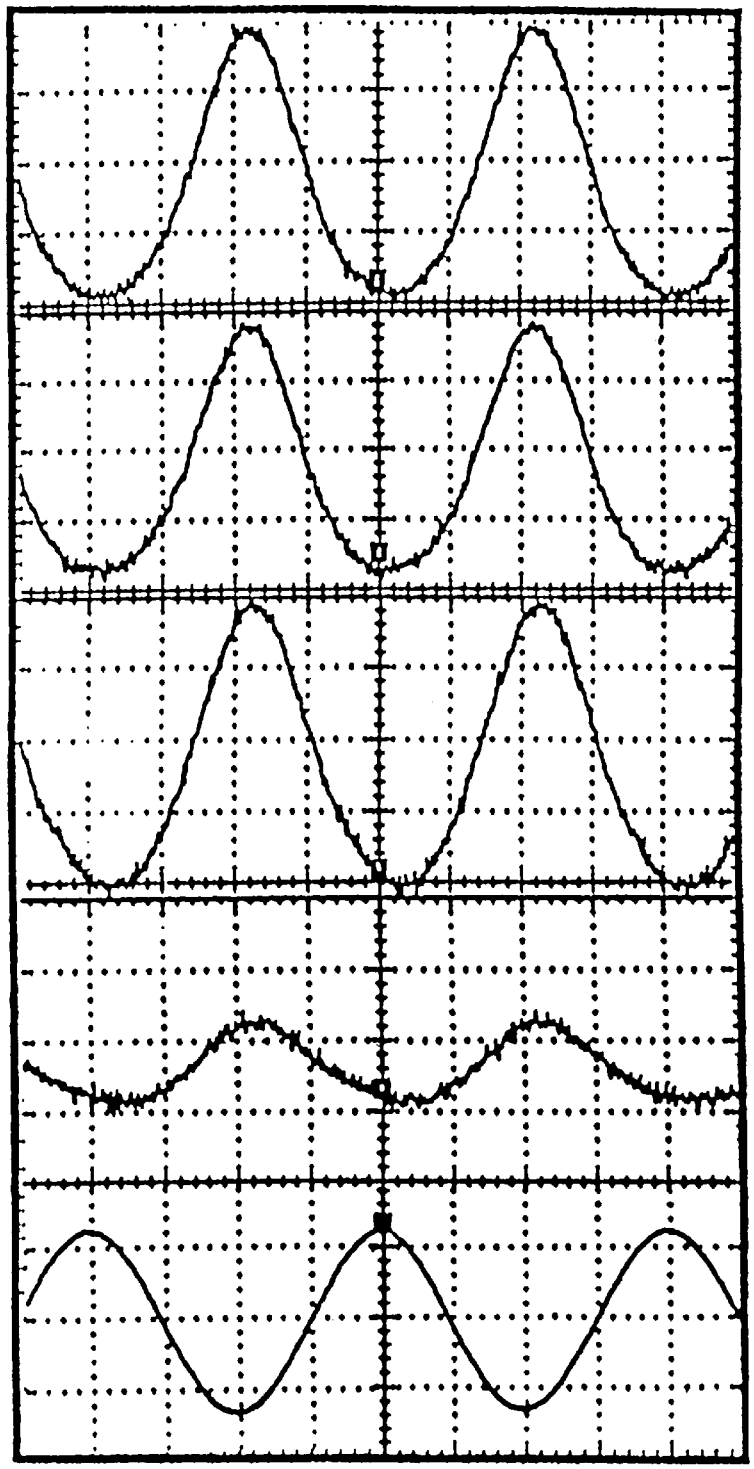
FIGS. 11(a), 11(b), 11(c), 11(d) and 11(e) show diagrams exhibiting the optical input-output characteristics (the temperature characteristics).

Using semiconductor laser B as the light source of the incident light on the glass optical device, the light having a wave length of 810 nm was modulated so that the wave form was sinusoidal and a modulation frequency was 1 MHz, and the optical input-output characteristic of the glass optical device was measured at various temperatures of the glass optical device. The temperature of the glass optical device was controlled by a cryostat or an electric furnace. The obtained results are shown in FIGS. 10(a), 10(b), 10(c), 10(d), 10(e), 11(a), 11(b), 11(c), 11(d) and 11(e). FIGS. 10(a), 10(b), 10(c), 10(d), 11(a), 11(b), 11(c) and 11(d) show wave forms of the transmitted light at −233° C., −203° C., −173° C., 27° C., 600° C., 700° C., 800° C. and 850° C., respectively. FIGS. 10(e) and 11(e) show the wave forms of the incident light. As clearly shown in above Figures, the laser light incident on the glass optical device at −203° C. to 850° C. came out with inverted light intensities after being transmitted through the glass optical device.

Example 3

Raw materials of a glass were weighed in amounts such that the glass had a composition of 48.3% by weight of $ErF_3$, 25.2% by weight of $BaF_2$, 18.1% by weight of $AlF_3$, 5.8% by weight of $MgF_2$, 1.5% by weight of NaF and 1.1% by weight of $CaF_2$ and a weight of 30 g. As the fluorinating agent, 3 g of ammonium hydrogenfluoride ($NH_4HF_2$) was added to the above raw materials and the materials were mixed together. The obtained mixture was placed into a platinum crucible. After the crucible was closed by a cap, the mixture was fluorinated in the nitrogen atmosphere at 450° C. for 1 hour and, then, melted and stirred in the nitrogen atmosphere at 900° C. for 1 hour. The melt was poured on an iron plate which was heated in advance and annealed and a fluoride glass doped with Er (erbium) element in a high concentration was obtained.

The obtained fluoride glass had a glass transition temperature of 416° C. as measured by a differential thermal analyzer in the nitrogen atmosphere, a density of 4.8 g/cm$^3$ as measured in accordance with the Archimedes' method and the calculated number of $Er^{3+}$ ions of $6.2\times10^{27}$ per 1 m$^3$.

Figure 12:
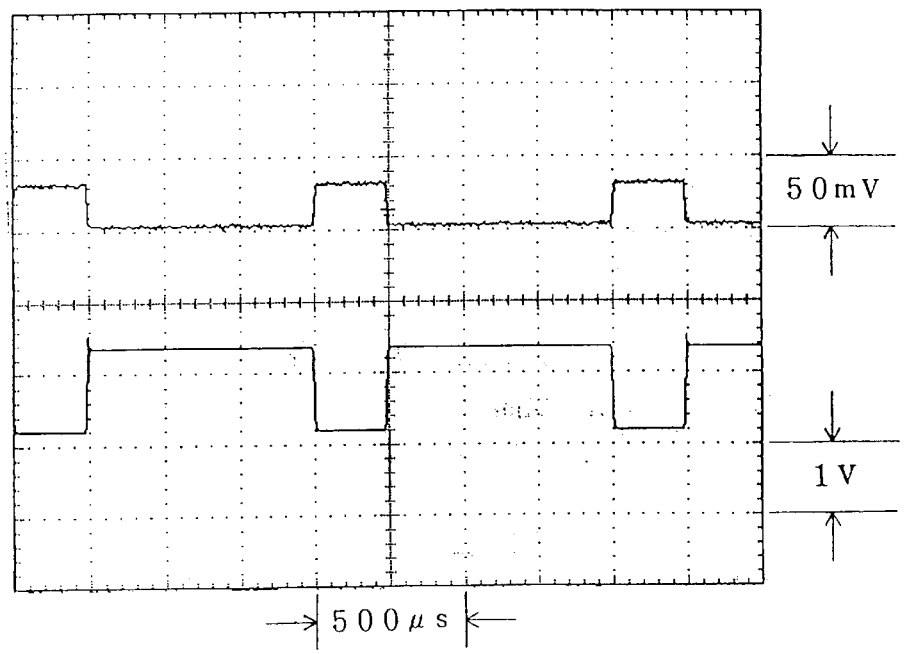
FIG. 12 shows a diagram exhibiting the optical input-output characteristic.

The obtained fluoride glass was cut and polished and a glass optical device having a thickness of 25 mm was obtained. Using semiconductor laser B as the light source of the incident light on this glass optical device, the optical input-output characteristic of the glass optical device was measured at a wave length of 811 nm, a modulation frequency of 1 kHz and a modulation degree of the incident light of 22%. The obtained results are shown in FIG. 12. In FIG. 12, the upper diagram shows the wave form of the transmitted light and the lower diagram shows the wave form of the incident light. As clearly shown in FIG. 12, the laser light incident on the glass optical device came out with inverted light intensities after being transmitted through the glass optical device.

Example 4

Figure 13:
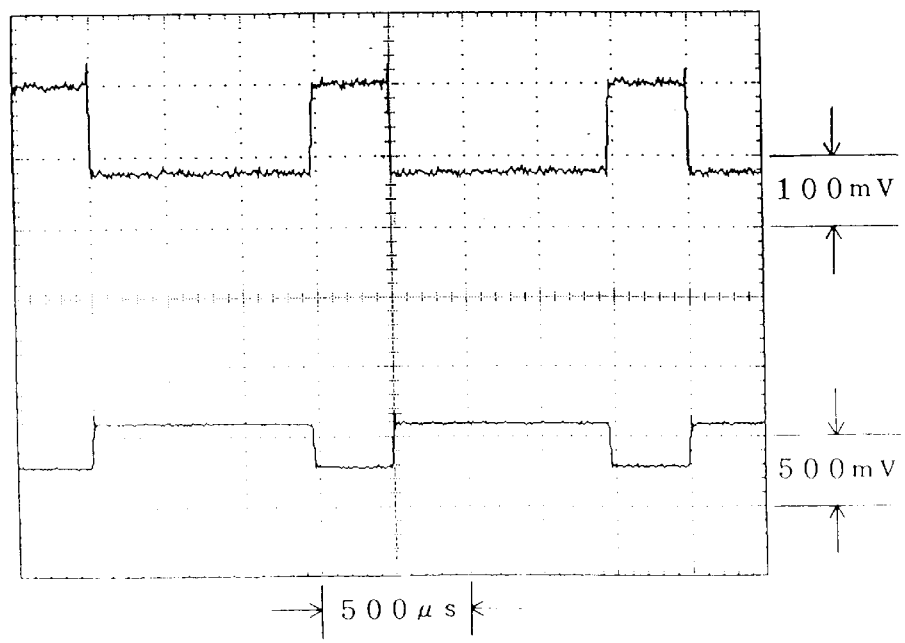
FIG. 13 shows a diagram exhibiting the optical input-output characteristic.

The borate glass obtained in Example 1 was cut and polished and a glass optical device having a thickness of 10 mm was obtained. Using semiconductor laser B as the light source of the incident light on this glass optical device, the optical input-output characteristic of the glass optical device was measured at a wave length of 811 nm, a modulation frequency of 1 kHz and a modulation degree of the incident light of 16%. The obtained results are shown in FIG. 13. In FIG. 13, the upper diagram shows the wave form of the transmitted light and the lower diagram shows the wave form of the incident light. As clearly shown in FIG. 13, the laser light incident on the glass optical device came out with inverted light intensities after being transmitted through the glass optical device.

Example 5

As raw materials of a glass, $Er_2O_3$, $Al(OH)_3$, $SiO_2$, $BaCO_3$ and $Sb_2O_3$ were weighed and mixed together in amounts such that the glass had a composition of 61.7% by weight of $Er_2O_3$, 14.4% by weight of $Al_2O_3$, 21.3% by weight of $SiO_2$, 2.1% by weight of BaO and 0.5% by weight of $Sb_2O_3$ and a weight of 100 g. The obtained mixture was placed into an alumina crucible. After the crucible was closed by a cap, the mixture was melted and stirred at 1,550° C. for 1 hour. The melt was poured on an iron plate which was heated in advance and annealed and an aluminosilicate glass doped with Er (erbium) element in a high concentration was obtained.

The obtained aluminosilicate glass had a density of 4.9 g/cm$^3$ as measured in accordance with the Archimedes' method and the calculated number of $Er^{3+}$ ions of $9.6 \times 10^{27}$ per 1 m$^3$.

The obtained aluminosilicate glass was cut and polished and a glass optical device having a thickness of 25 mm was obtained.

Figure 14A:
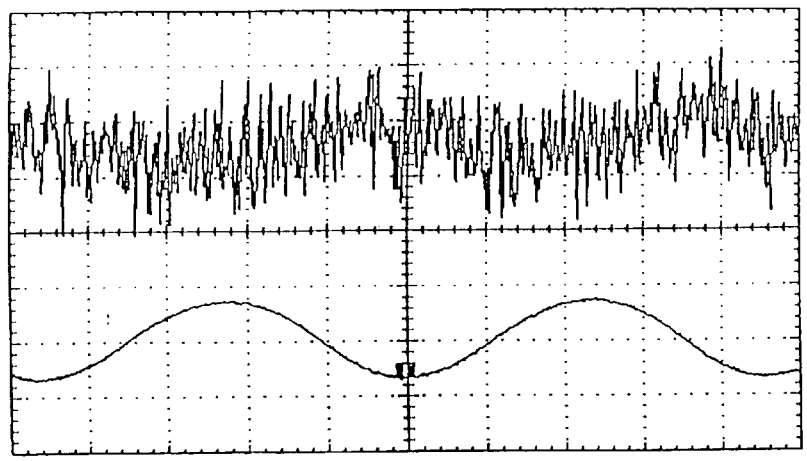
FIGS. 14 (a), 14(b) and 14(c) show diagrams exhibiting the optical input-output characteristics (the frequency characteristics).
Figure 14B:
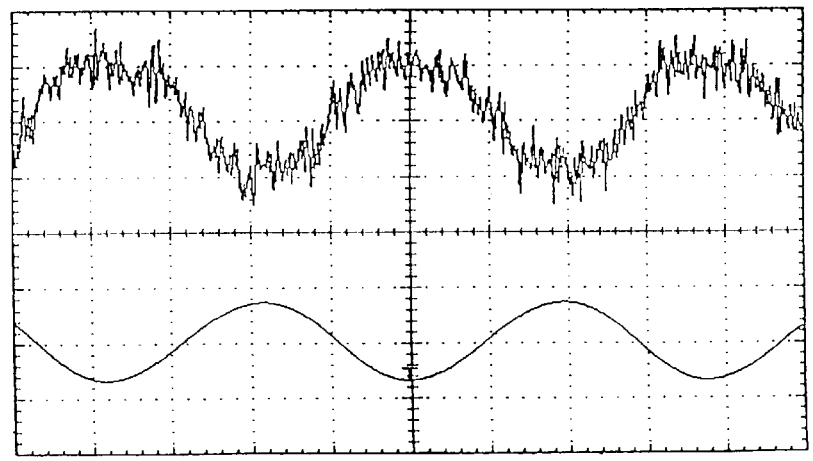
Figure 14C:
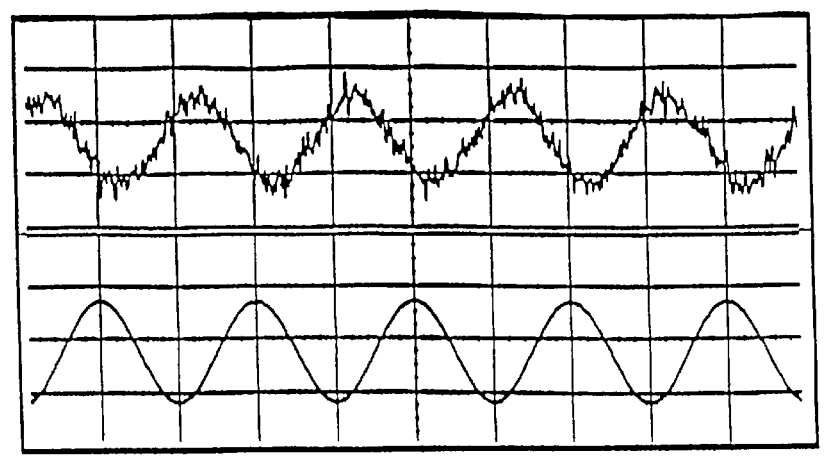

Using semiconductor laser B as the light source of the incident light on this glass optical device, the light having a wave length of 809 nm was modulated so that the wave form was sinusoidal and modulation frequencies were 5 Hz, 1 kHz and 100 MHz, and the optical input-output characteristic (the frequency characteristic) of the glass optical device was measured. The obtained results are shown in FIGS. 14(a), 14(b) and 14(c). FIGS. 14(a), 14(b) and 14(c) show the wave forms of the transmitted light (the upper diagrams) and the wave forms of the incident light (the lower diagrams) at the modulation frequencies of 5 Hz, 1 kHz and 100 MHz, respectively. As clearly shown in these Figures, the laser light incident on the glass optical device came out with inverted light intensities after being transmitted through the glass optical device.

Example 6

As raw materials of a glass, $Er_2O_3$, $Al(OH)_3$ and $SiO_2$ were weighed and mixed together in amounts such that the glass had a composition of 64.8% by weight of $Er_2O_3$, 14.8% by weight of $Al_2O_3$ and 20.4% by weight of $SiO_2$ and a weight of 150 g. The obtained mixture was placed into an alumina crucible. After the crucible was closed by a cap, the mixture was melted and stirred at 1,600° C. for 1 hour. The melt was poured on an iron plate which was heated in advance and annealed and an aluminosilicate glass doped with Er (erbium) element in a high concentration was obtained.

The obtained aluminosilicate glass had a density of 5.1 g/cm$^3$ as measured in accordance with the Archimedes' method and the calculated number of $Er^{3+}$ ions of $10.4 \times 10^{27}$ per 1 m$^3$.

The obtained aluminosilicate glass was cut and polished and a glass optical device having a thickness of 13 mm was obtained.

Figure 15:
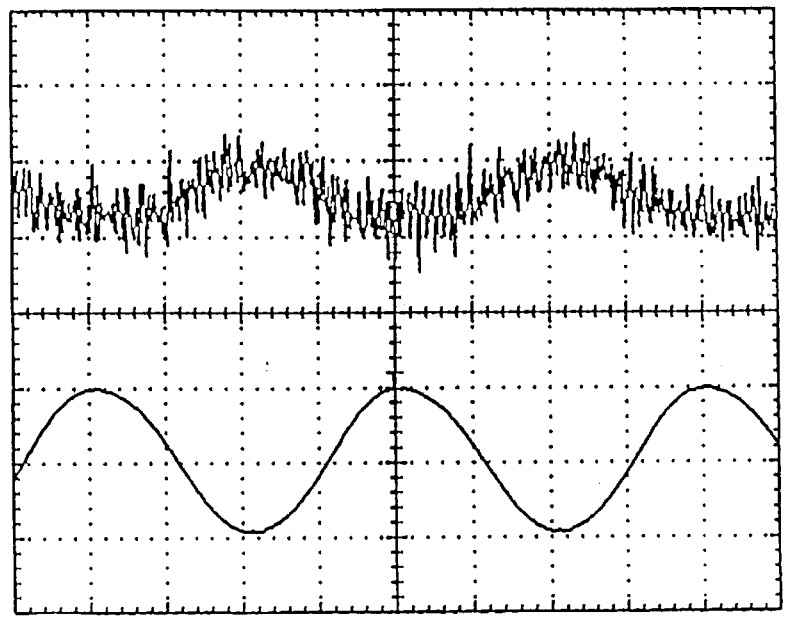
FIG. 15 shows a diagram exhibiting the optical input-output characteristic.

Using semiconductor laser A as the light source of the incident light on this glass optical device, the light having a wave length of 805 nm was modulated so that the wave form was sinusoidal and a modulation frequency was 1 MHz, and the optical input-output characteristic of the glass optical device was measured. The obtained results are shown in FIG. 15. In FIG. 15, the upper diagram shows the wave form of the transmitted light and the lower diagram shows the wave form of the incident light. As clearly shown in FIG. 15, the laser light incident on the glass optical device came out with inverted light intensities after being transmitted through the glass optical device.

Example 7

As raw materials of a glass, $Er_2O_3$, $Al(OH)_3$ and $SiO_2$ were weighed and mixed together in amounts such that the glass had a composition of 59.3% by weight of $Er_2O_3$, 15.8% by weight of $Al_2O_3$, and 24.9% by weight of $SiO_2$ and a weight of 150 g. The obtained mixture was placed into an alumina crucible. After the crucible was closed by a cap, the mixture was melted and stirred at 1,600° C. for 1 hour. The melt was poured on an iron plate which was heated in advance and annealed and an aluminosilicate glass doped with Er (erbium) element in a high concentration was obtained.

The obtained aluminosilicate glass had a density of 4.7 g/cm$^3$ as measured in accordance with the Archimedes' method and the calculated number of $Er^{3+}$ ions of $8.7 \times 10^{27}$ per 1 m$^3$.

The obtained aluminosilicate glass was cut and polished and a glass optical device having a thickness of 16 mm was obtained.

Using semiconductor laser B as the light source of the incident light on this glass optical device, the light having a wave length in the region around 800 nm was modulated so that the wave form was sinusoidal and a modulation frequency was 1 kHz, and the optical input-output characteristic of the glass optical device was measured. As the result of the measurement, the laser light having the wave length in the range of 792 nm to 810 nm incident on the glass optical device came out with inverted light intensities after being transmitted through the glass optical device.

Example 8

As raw materials of a glass, $Er_2O_3$, $TeO_2$ and $WO_3$ were weighed and mixed together in amounts such that the glass had a composition of 20.0% by weight of $Er_2O_3$, 60.0% by weight of $TeO_2$ and 20.0% by weight of $WO_3$ and a weight of 100 g. The obtained mixture was placed into an alumina crucible. After the crucible was closed by a cap, the mixture was melted and stirred at 1,000° C. for 1 hour. The melt was poured on an iron plate which was heated in advance and annealed and a tellurite glass doped with Er (erbium) element in a high concentration was obtained.

The obtained tellurite glass had a density of 6.0 g/cm$^3$ as measured in accordance with the Archimedes' method and the calculated number of $Er^{3+}$ ions of $3.8 \times 10^{27}$ per 1 m$^3$.

The obtained tellurite glass was cut and polished and a glass optical device having a thickness of 39 mm was obtained.

Figure 16:
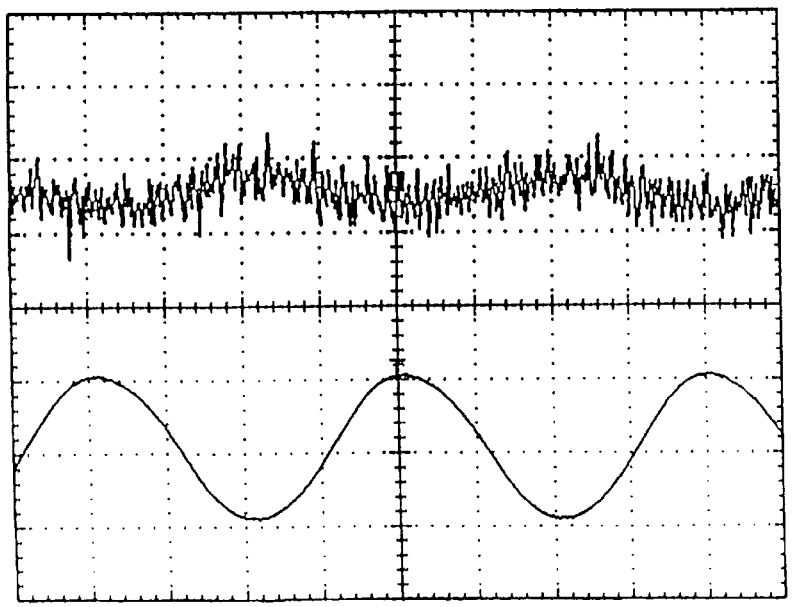
FIG. 16 shows a diagram exhibiting the optical input-output characteristic.

Using semiconductor laser A as the light source of the incident light on this glass optical device, the light having a wave length of 805 nm was modulated so that the wave form was sinusoidal and a modulation frequency was 1 MHz, and the optical input-output characteristic of the glass optical device was measured. The obtained results are shown in FIG. 16. In FIG. 16, the upper diagram shows the wave form of the transmitted light and the lower diagram shows the wave form of the incident light. As clearly shown in FIG. 16, the laser light incident on the glass optical device came out with inverted light intensities after being transmitted through the glass optical device.

Example 9

As raw materials of a glass, $Er_2O_3$, $SiO_2$, $BaCO_3$ and $Sb_2O_3$ were weighed and mixed together in amounts such that the glass had a composition of 35.7% by weight of $Er_2O_3$, 20.3% by weight of $SiO_2$, 43.5% by weight of BaO and 0.5% by weight of $Sb_2O_3$ and a weight of 160 g. The obtained mixture was placed into an alumina crucible. After the crucible was closed by a cap, the mixture was melted and stirred at 1,550° C. for 1 hour. The melt was poured on an iron plate which was heated in advance and annealed and a silicate glass doped with Er (erbium) element in a high concentration was obtained.

The obtained silicate glass had a density of 5.3 g/cm³ as measured in accordance with the Archimedes' method and the calculated number of $Er^{3+}$ ions of $6.0\times10^{27}$ per 1 m³.

The obtained silicate glass was cut and polished and a glass optical device having a thickness of 25 mm was obtained.

Figure 17:
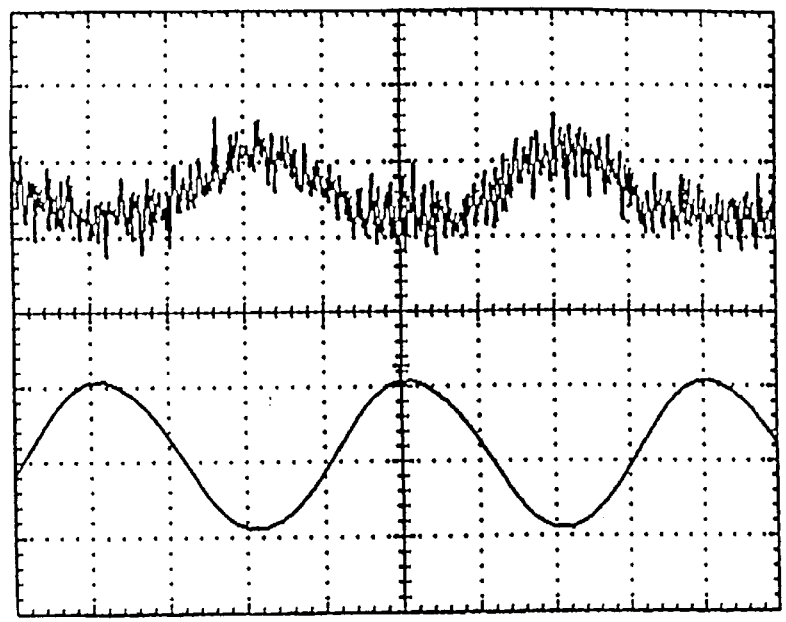
FIG. 17 shows a diagram exhibiting the optical input-output characteristic.

Using semiconductor laser A as the light source of the incident light on this glass optical device, the light having a wave length of 805 nm was modulated so that the wave form was sinusoidal and a modulation frequency was 1 MHz, and the optical input-output characteristic of the glass optical device was measured. The obtained results are shown in FIG. 17. In FIG. 17, the upper diagram shows the wave form of the transmitted light and the lower diagram shows the wave form of the incident light. As clearly shown in FIG. 17, the laser light incident on the glass optical device came out with inverted light intensities after being transmitted through the glass optical device.

Examples 10 to 18

Raw materials of glasses selected from $Er_2O_3$, $SiO_2$, $Al(OH)_3$, $TiO_2$, $BaCO_3$, $ZrO_2$, $Sb_2O_3$, $CaCO_3$, $Li_2CO_3$, $H_3BO_3$, $Na_2CO_3$, ZnO, PbO, $ErF_3$, $AlPO_4$, $CaF_2$, $BaF_2$ and $AlF_3$ were weighed and then mixed together in amounts such that the glasses had the compositions shown in Table 1. The obtained mixture was placed into an alumina crucible or a platinum crucible. After the crucible was closed by a cap, the mixture was melted and stirred at the temperature shown in Table 1 for about 1 hour. The melt was poured on an iron plate which was heated in advance and annealed and a glass doped with Er (erbium) element in a high concentration was obtained. In this manner, various glasses were obtained.

The densities as measured in accordance with the Archimedes' method and the calculated numbers of $Er^{3+}$ ions per 1 m³ of the glasses are shown in Table 1.

The obtained glasses were cut and polished and glass optical devices were obtained. Using semiconductor laser A as the light source of the incident light on these glass optical devices, the light having a wave length of 805 nm was modulated so that the wave form was sinusoidal and a modulation frequency was 1 MHz, and the optical input-output characteristics of the glass optical devices were measured. The laser light incident on the glass optical devices came out with inverted light intensities after being transmitted through the glass optical devices.

Example 19

The phosphate glass obtained in Example 2 was cut and polished and a glass optical device having a thickness of 3 mm was obtained.

Figure 18:
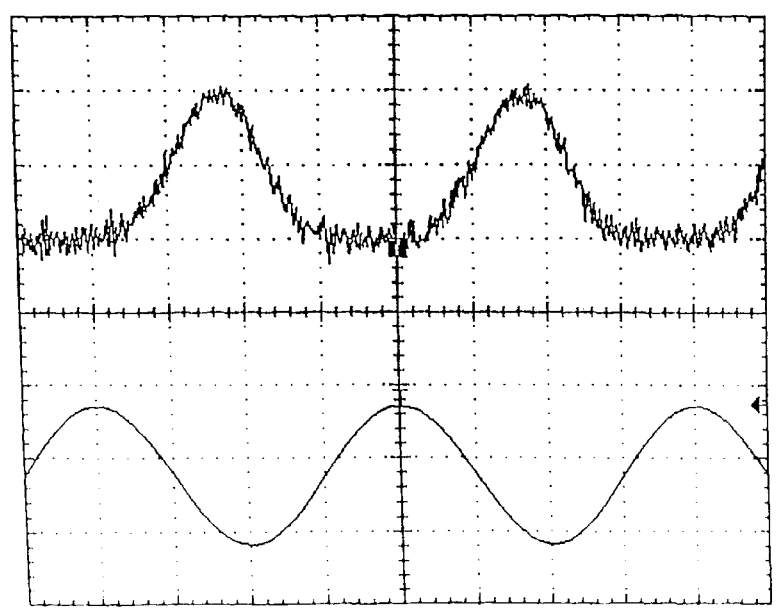
FIG. 18 shows a diagram exhibiting the optical input-output characteristic.
Figure 19A:
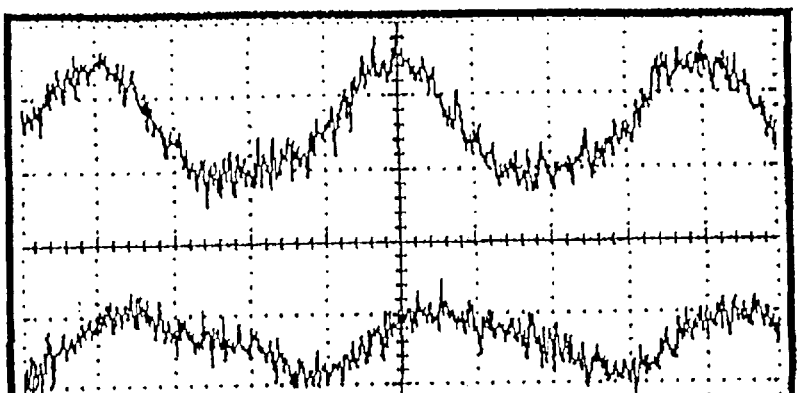
FIGS. 19(a), 19(b), 19(c), 19(d), 19(e) and 19(f) show diagrams exhibiting the optical input-output characteristics (the wave length characteristics).
Figure 19B:
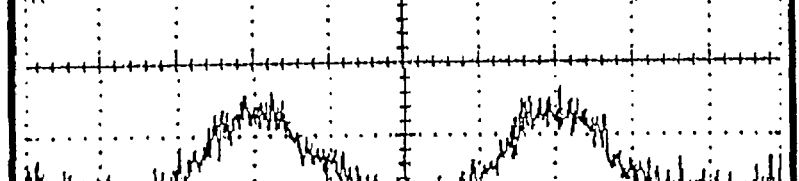
Figure 19C:
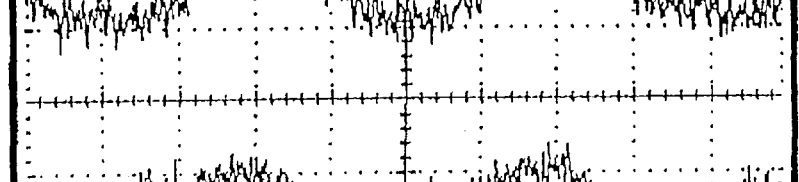
Figure 19D:
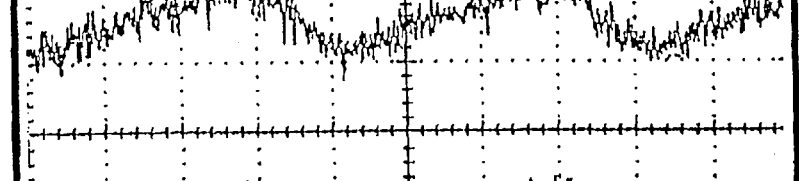
Figure 19E:
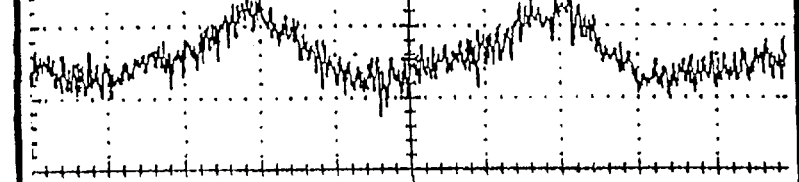
Figure 19F:
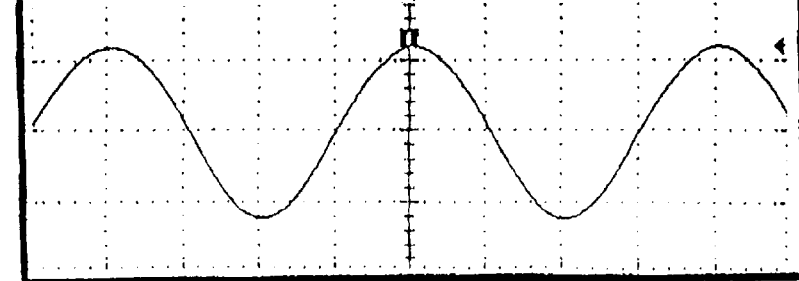
Figures 20A, 20B, 20C, 20D, 20E:
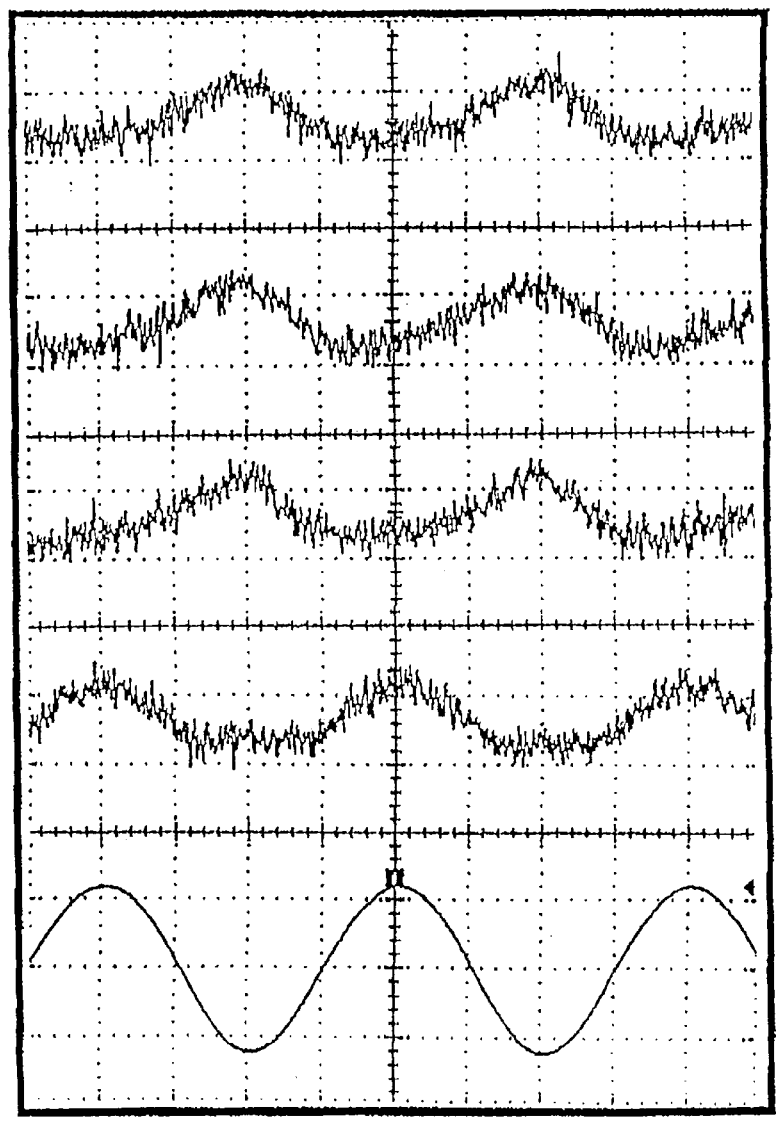
FIGS. 20(a), 20(b), 20(c), 20(d) and 20(e) show diagrams exhibiting the optical input-output characteristics (the wave length characteristics).

Using semiconductor laser C as the light source of the incident light on this glass optical device, the light having a wave length of 1,530 nm was modulated so that the wave form was sinusoidal and a modulation frequency was 100 kHz, and the optical input-output characteristic of the glass optical device was measured. The obtained results are shown in FIG. 18. In FIG. 18, the upper diagram shows the wave form of the transmitted light and the lower diagram shows the wave form of the incident light. As clearly shown in FIG. 18, the laser light incident on the glass optical device came out with inverted light intensities after being transmitted through the glass optical device.

Example 20

The aluminosilicate glass obtained in Example 6 was cut and polished and a glass optical device having a thickness of 3.5 mm was obtained.

Using semiconductor laser C as the light source of the incident light on this glass optical device, the light having a wave length in the range of 1,500 nm to 1,555 nm was modulated so that the wave form was sinusoidal and a modulation frequency was 1 kHz, and the optical input-output characteristic of the glass optical device was measured. The obtained results are shown in FIGS. 19(*a*), 19(*b*), 19(*c*), 19(*d*), 19(*e*), 19(*f*), 20(*a*), 20(*b*), 20(*c*), 20(*d*) and 20(*e*). FIGS. 19(*a*), 19(*b*), 19(*c*), 19(*d*), 19(*e*), 20(*a*), 20(*b*), 20(*c*) and 20(*d*) show wave forms of the transmitted light having wave lengths of 1,500 nm, 1,505 nm, 1,510 nm, 1,520 nm, 1,530 nm, 1,540 nm, 1,545 nm, 1,550 nm and 1,555 nm, respectively. FIGS. 19(*f*) and 20(*e*) show wave forms of the incident light. As clearly shown in these Figures, the laser light having the wave length in the range of 1,510 nm to 1,550 nm and incident on the glass optical device came out with inverted light intensities after being transmitted through the glass optical device.

Example 21

The glasses obtained in Examples 1, 3, 5, 6, 7, 8, 9, 10, 13, 14, 15, 16 and 17 were cut and polished and glass optical

TABLE 1

| | Composition (% by weight) | Melting temperature (° C.) | Density (g/cm³) | Number of $Er^{3+}$ion (/m³) |
|---|---|---|---|---|
| Example 10 | $Er_2O_3$ (57.3), $SiO_2$ (14.6), $Al_2O_3$ (15.2), $TiO_2$ (7.0), BaO (2.1), $ZrO_2$ (3.4), $Sb_2O_3$ (0.4) | 1,550 | 5.2 | $9.4 \times 10^{27}$ |
| Example 11 | $Er_2O_3$ (35.8), $B_2O_3$ (26.0), $SiO_2$ (16.9), CaO (15.7), $Li_2O$ (5.6) | 1,250 | 3.6 | $4.0 \times 10^{27}$ |
| Example 12 | $Er_2O_3$ (29.7), $SiO_2$ (55.9), $Na_2O$ (14.4) | 1,550 | 3.1 | $2.9 \times 10^{27}$ |
| Example 13 | $Er_2O_3$ (55.7), $SiO_2$ (21.6), $Al_2O_3$ (14.6), BaO (1.9), ZnO (5.8), $Sb_2O_3$ (0.4) | 1,550 | 4.9 | $8.6 \times 10^{27}$ |
| Example 14 | $Er_2O_3$ (53.0), $SiO_2$ (30.0), $Al_2O_3$ (17.0) | 1,600 | 4.4 | $7.3 \times 10^{27}$ |
| Example 15 | $Er_2O_3$ (58.8), $SiO_2$ (30.8), $Al_2O_3$ (10.4) | 1,600 | 4.4 | $8.2 \times 10^{27}$ |
| Example 16 | $Er_2O_3$ (59.9), $SiO_2$ (18.8), $Al_2O_3$ (21.3) | 1,600 | 4.9 | $9.2 \times 10^{27}$ |
| Example 17 | $Er_2O_3$ (30.7), $SiO_2$ (16.9), PbO (39.4), BaO (6.2), ZnO (3.1), $Na_2O$ (0.7), $B_2O_3$ (2.8), $Sb_2O_3$ (0.2) | 1,350 | 5.6 | $5.4 \times 10^{27}$ |
| Example 18 | $ErF_3$ (26.2), $Al_2O_3$ (7.5), $P_2O_5$ (8.3), $CaF_2$ (15.4), $BaF_2$ (26.0), $AlF_3$ (16.6) | 1,200 | 4.3 | $3.0 \times 10^{27}$ | devices having a thickness of 3 mm were obtained. When the optical input-output characteristics were measured in accordance with the same procedures as those conducted in Example 19, the transmitted light was obtained with inverted light intensities.

Example 22

The glasses obtained in Examples 1, 2, 3, 5, 6, 7, 8, 9, 10, 11, 12, 13, 14, 15, 16, 17 and 18 were cut and polished and glass optical devices having a thickness of 6 mm were obtained. When the optical input-output characteristics were measured in accordance with the same procedures as those conducted in Example 19, the transmitted light was obtained with inverted light intensities.

Industrial Applicability

The amorphous optical device of the present invention has a smaller thickness and exhibits the negative optical input-output characteristic in the wider range of modulation frequencies of 1 Hz to 1 GHz and the transmitted light has a larger modulation degree in comparison with those of conventional devices. In particular, when the amorphous material is a glass, the amorphous material is suitable for mass production and can be easily formed and, by the combination of these properties, amorphous optical devices having various shapes and exhibiting excellent noise resistance can be produced. Since optical signals can be inverted due to the negative optical input-output characteristic of the amorphous optical device, optical inverters and all-optical switching devices of the NOT type can be constructed. By using this amorphous optical device, novel optical computers capable of performing ultra-high speed and parallel processing, object recognizing apparatuses in which image optical signals are processed by using image optical signals, motion picture extracting apparatuses used for eyes of robots and object movement monitors and optical surge absorbers in optical communication and optical instrumentation can be economically constructed. Since an amorphous materials is used as the matrix, a device exhibiting an absorption spectrum in a wide range and little temperature dependency of the negative optical input-output characteristic can be obtained.

What is claimed is:

1. An amorphous optical device which is doped with an element having a negative optical input-output characteristic to incident light, wherein the number of ions and/or atoms of the element is $1\times10^{26}$ to $2.8\times10^{28}$ per 1 $m^3$ of an amorphous material, and has a negative optical input-output characteristic to incident light.

2. An amorphous optical device according to claim 1, wherein the element having a negative optical input-output characteristic to incident light is a rare earth element or a transition element.

3. An amorphous optical device according to claim 2, wherein the rare earth element is Er (erbium).

4. An amorphous optical device according to claim 1, wherein the amorphous material is a glass.

5. An amorphous optical device according to claim 4, wherein the glass is a borate glass, a phosphate glass, a silicate glass, a borosilicate glass, an aluminosilicate glass, a tellurite glass, a fluorophosphate glass or a fluoride glass.

6. An amorphous optical device which comprises the amorphous optical device described in claim 1 shaped two dimensionally and controls image optical signals directly by using image optical signals.

7. An amorphous optical device according to claim 1, which uses light obtained by spectrally splitting or filtering sunlight, thermal radiation light or light emitted from a fluorescent material by electrons emitted by electric field, or laser light as a light source.

* * * * *